(12) United States Patent
Ward

(10) Patent No.: US 9,962,631 B2
(45) Date of Patent: May 8, 2018

(54) EFFLUENT WEIR SYSTEM

(71) Applicant: Stuart J Ward, Camas, WA (US)

(72) Inventor: Stuart J Ward, Camas, WA (US)

(*) Notice: Subject to any disclaimer, the term of this patent is extended or adjusted under 35 U.S.C. 154(b) by 186 days.

(21) Appl. No.: 14/333,998

(22) Filed: Jul. 17, 2014

(65) Prior Publication Data

US 2014/0326662 A1 Nov. 6, 2014

Related U.S. Application Data

(63) Continuation-in-part of application No. 13/848,022, filed on Mar. 20, 2013, which is a continuation-in-part of application No. 12/683,307, filed on Jan. 6, 2010, and a continuation-in-part of application No. 13/160,459, filed on Jun. 14, 2011, now Pat. No. 8,431,022, which is a continuation-in-part of application No. 12/856,053, filed on Aug. 13, 2010, application No. 13/848,022, which is a continuation-in-part of application No. 12/683,340, filed on Jan. 6, 2010.

(60) Provisional application No. 61/146,955, filed on Jan. 23, 2009.

(51) Int. Cl.
| | |
|---|---|
| C02F 1/24 | (2006.01) |
| B01D 21/24 | (2006.01) |
| B01D 21/00 | (2006.01) |
| B01D 21/01 | (2006.01) |
| B01D 21/34 | (2006.01) |

(52) U.S. Cl.
CPC ..... *B01D 21/2444* (2013.01); *B01D 21/0018* (2013.01); *B01D 21/0045* (2013.01); *B01D 21/01* (2013.01); *B01D 21/2438* (2013.01); *B01D 21/34* (2013.01); *C02F 1/24* (2013.01)

(58) Field of Classification Search
USPC .................... 210/221.2, 205, 206
See application file for complete search history.

(56) References Cited

U.S. PATENT DOCUMENTS

| | | | | |
|---|---|---|---|---|
| 1,405,022 A | * | 1/1922 | Slade | B01D 21/14 127/13 |
| 2,625,175 A | * | 1/1953 | Wilson | B01D 17/0214 137/172 |
| 2,765,919 A | * | 10/1956 | Juell | 210/703 |
| 3,246,763 A | * | 4/1966 | Baum | 210/221.2 |
| 3,850,813 A | * | 11/1974 | Pall | B01D 29/111 210/232 |

(Continued)

FOREIGN PATENT DOCUMENTS

SU 1212962 * 2/1986

*Primary Examiner* — Thomas M Lithgow
(74) *Attorney, Agent, or Firm* — Mark E. Beatty; Rylander & Associates PC

(57) ABSTRACT

An effluent weir system includes: one or more effluent wefts mountable within a separation tank; the effluent weir having an enclosed top portion, a bottom inlet and a discharge in fluid communication with a clear well riser; a clear well in fluid communication with the separation tank through the effluent weirs; a clear well riser with a bottom portion in fluid communication with the effluent weir discharge and a riser discharge, the riser discharge height being adjustable and including one or more sealing members. An effluent weir system may include multiple effluent weirs in fluid communication with multiple clear well risers. The effluent weir may include a peaked top portion.

17 Claims, 37 Drawing Sheets

(56) References Cited

U.S. PATENT DOCUMENTS

| | | | | |
|---|---|---|---|---|
| 4,022,696 A | * | 5/1977 | Krofta | C02F 1/24 |
| | | | | 209/170 |
| 4,043,912 A | * | 8/1977 | Bascope et al. | 210/776 |
| 4,544,487 A | * | 10/1985 | Bosnjak | B01D 21/0063 |
| | | | | 210/522 |
| 8,431,022 B2 | * | 4/2013 | Ward | 210/221.2 |

* cited by examiner

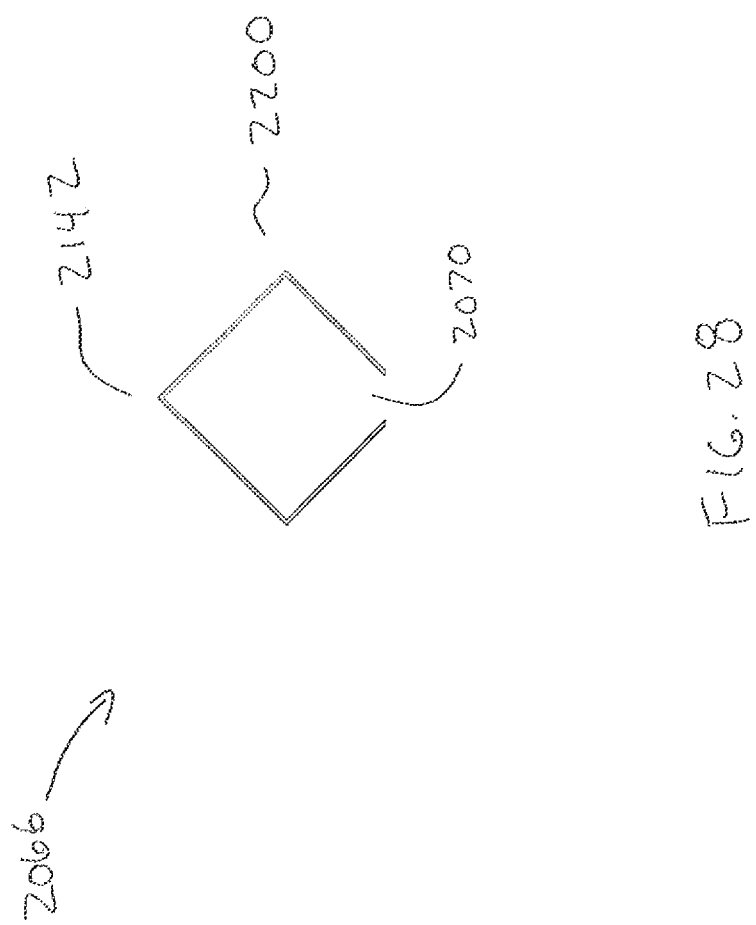

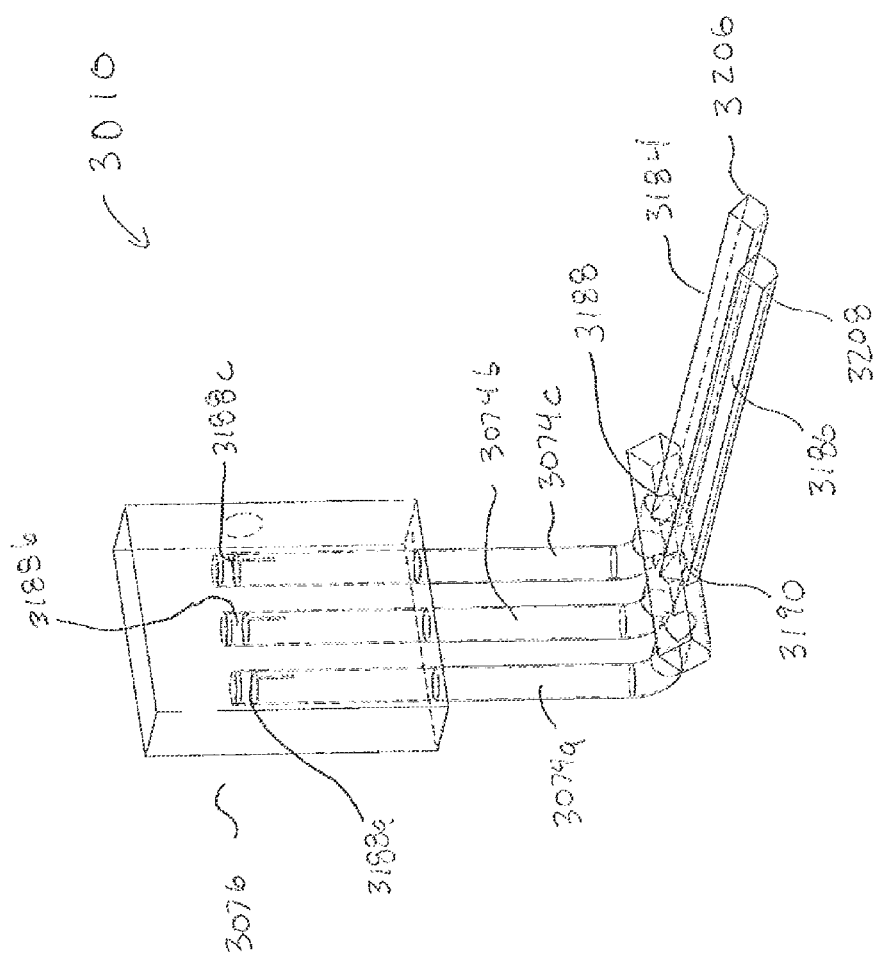

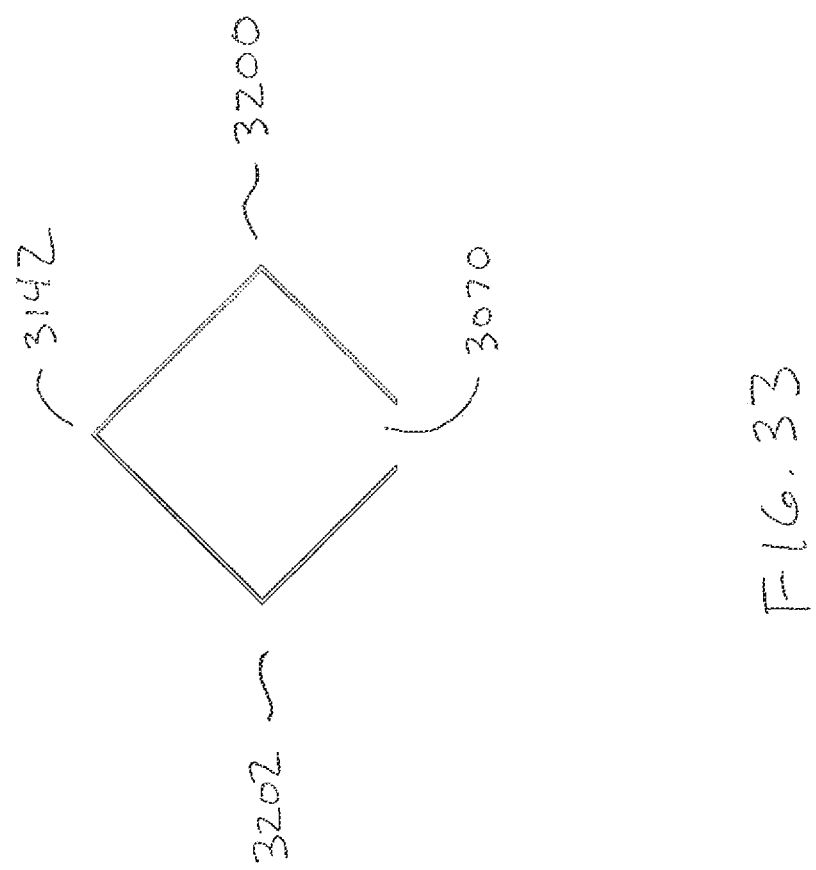

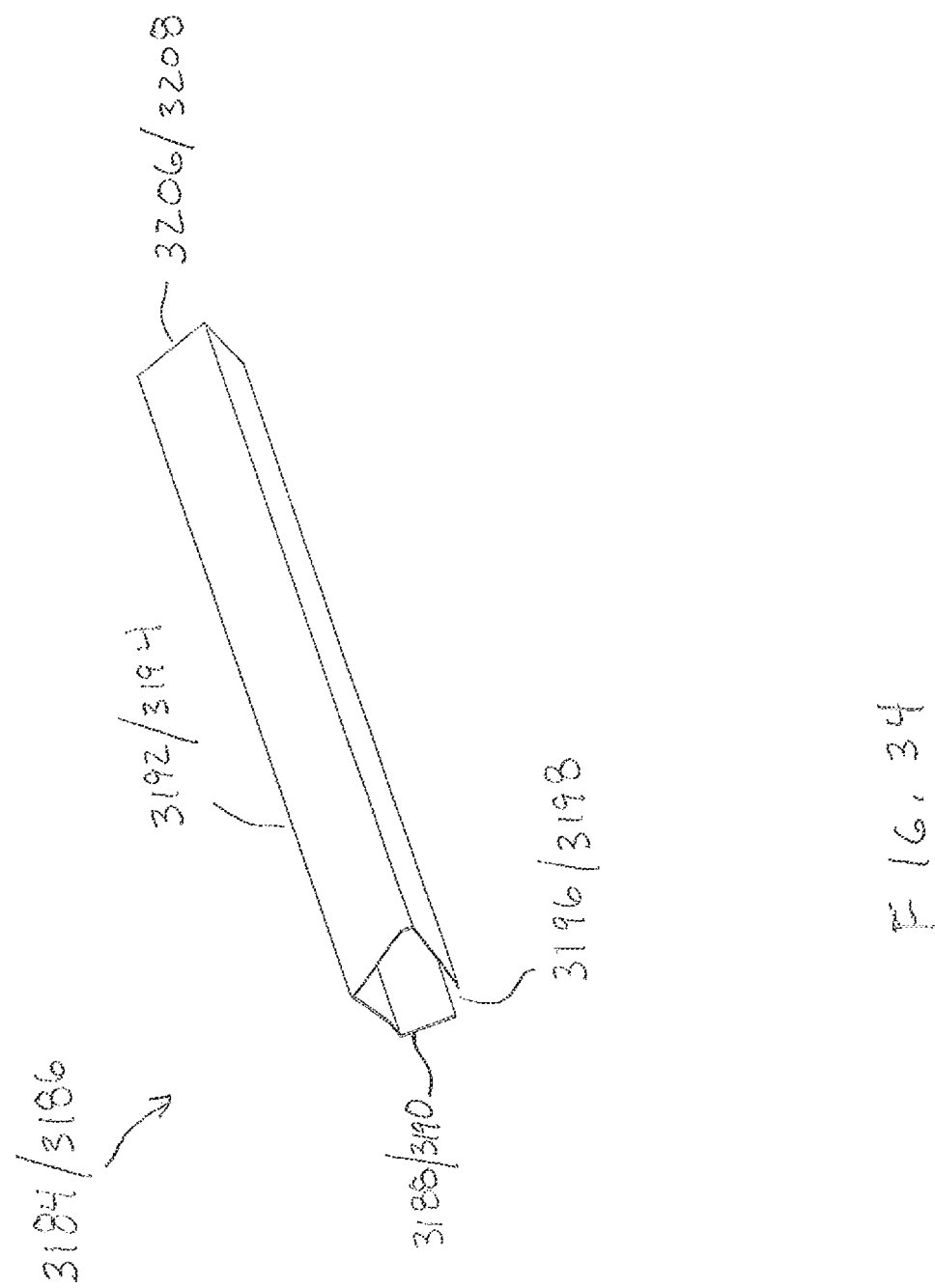

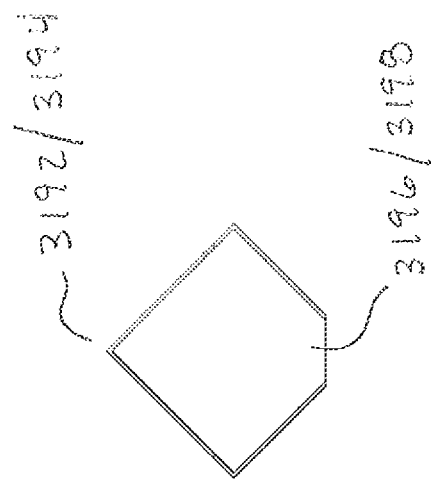

EFFLUENT WEIR SYSTEM

CROSS-REFERENCE TO RELATED APPLICATION

This application is a continuation-in-part of and claims priority to co-pending U.S. Nonprovisional application Ser. No. 13/848,022, filed Mar. 20, 2013. Application Ser. No. 13/848,022 is a continuation-in-part of U.S. Nonprovisional application Ser. No. 12/683,307 filed Jan. 6, 2010 (abandoned), which in turn claimed priority to U.S. Provisional Application 61/146,955 filed Jan. 23, 2009. Application Ser. No. 13/848,022 is also a continuation-in-part of and claims priority to U.S. Nonprovisional application Ser. No. 13/160,459 filed Jun. 14, 2011 (issued as U.S. Pat. No. 8,431,022 on Apr. 30, 2013), which in turn was a continuation-in-part of and claimed priority to U.S. Nonprovisional application Ser. No. 12/856,053, filed Aug. 13, 2010 (abandoned). Application Ser. No. 13/848,022 is also a continuation-in-part of and claims priority to U.S. Nonprovisional application Ser. No. 12/683,340, filed Jan. 6, 2010 (abandoned). The disclosures of each of the preceding applications are hereby incorporated by reference into this application.

FIELD OF THE INVENTION

The present invention relates to an improved effluent weir system for liquid treatment systems using separation tanks to assist in clarify liquid streams contaminated with particulates.

BACKGROUND

Clarification relates to reducing solids content water or other liquid streams, for example syrups and oils, which cannot be efficiently removed solely by mechanical filtration methods. Often a clarification process is used to remove non-dissolved solids before further waste processing, or may be applied to provide water which is clean enough to recycle into the same process even if not clean enough for discharge. Dissolved aeration flotation (DAF) is a widely used method to remove organic contaminants from wastewater streams such as from food processing plants. The basic process consists of injecting water saturated with gas—either air or another gas selected to be less reactive with a particular waste chemistry—into a flotation tank ("aeration") where the gas comes out of solution forming bubbles which float to the surface of the tank. The aerated water is created by dissolving gas into the water in a high pressure environment until it reaches saturation level at that high pressure. When the gas-saturated water at high pressure is depressurized the gas comes out of solution. Bubble size and density can be controlled by varying, among other things, the maximum saturation pressure and the rate of depressurization. The rising gas bubbles adhere to particulates in the wastewater and lift them to the surface where they are skimmed off. The floating particulate matter is referred to as "retentate", and after removal is referred to as "sludge". Aeration may be accomplished using pressurized saturation tanks or pumps designed for the purpose, such as aeration turbine pumps.

Flocculate agents may be mixed with the wastewater prior to aeration to react with or bind to particulates, creating larger and less dense suspended coagulated particles which are more susceptible to binding with gas bubbles and thereby more effectively driven to the surface for removal. Many flocculating chemicals are known and selected based on the anticipated chemistry of the waste stream and the expected downstream uses of the clarified effluent and retentate sludge. Retaining wastewater in a flotation tank exposed to aerated water for a longer period provides greater removal effectiveness.

Although described in conjunction with a DAF wastewater treatment system, the effluent weir apparatus is useful for other clarification systems and methods, including for example simple settling tank systems without added chemicals or separation plates, or heated settling tanks such as used for lube oil systems. In this application, "settling tank" and "separation tank" are used in their general sense, and intended to be interchangeable.

Additional problems arise with conventional effluent weir designs, which generally comprise either an edge trough at the liquid operating level of the tank, or a submerged weir pipe with perforations distributed along its surface, including the top surface. These designs allow particulates to enter the trough weir pipe and foul the pipe, reducing flow and potentially contaminating the effluent discharge. This design also creates a problem of sediments accumulating at the overflow edge of the edge trough, or on the relatively flat upper surface of conventional submerged weir pipes, which periodically dislodge and create spikes of particulates in the effluent, especially in weir pipes with top inlets. Maintenance requirements are substantially increased due to more frequent flushing required and more difficult cleaning during shutdowns.

Mounting the effluent weir apparatus transverse to the bulk flow within a separation tank aids in further slowing fluid velocity, improving settling out of heavier particulates, without interfering with laminar flow in the bulk fluid above the effluent weir.

Thus, there is a need for an improved effluent weir apparatus for fluid treatment systems that: (1) is compact; (2) can be retrofitted to existing separation tanks/systems to improve efficiency of legacy systems; (3) provides improved methods for removing effluent; (4) reduces buildup of sediments on surfaces; (5) provides improved solids removal efficiency; (6) improves laminar flow within the separation vessel; (7) reduces water velocity within the separation vessel; (8) improves dwell time within the separation vessel; (9) provides for adjustable height risers to control system liquid level; and, (10) improves overall efficiency and cost effectiveness.

SUMMARY AND ADVANTAGES

An effluent weir system for a fluid treatment system having a separation tank includes one or more effluent weirs mountable within the separation tank, the effluent weir having an enclosed top portion and a bottom inlet and a discharge in fluid communication with a clear well riser, the clear well riser extending from a bottom portion in fluid communication with the effluent weir discharge to a riser discharge. The height of the riser discharge may be lower than clear well side wall top portions and defines the liquid operating level of the system, preventing overflow.

In an embodiment, an effluent weir includes an elongated pipe and the enclosed top part having an upward peaked top, the elongated pipe extending to a closed end within the settling tank, the pipe cross section comprising a diamond shape oriented with an apex on top. The pipe cross section may be substantially square.

The interior cross section of the effluent weir may extends beyond the interior cross section of clear well riser lower portion, thereby further lowering effluent discharge velocity.

The improved effluent weir system may include adjustable height risers, thereby allowing the discharge system to control the operating level within the separation tank. The adjustable height risers may include one or more sealing members.

The improved effluent weir system may include a plurality of effluent weirs and corresponding clear well risers, all of which may provide adjustable height.

The present invention provides many advantages over existing systems: (1) it is compact; (2) can be retrofitted to existing separation tanks/systems to improve efficiency of legacy systems; (3) provides improved methods for removing effluent; (4) reduces buildup of sediments on surfaces; (5) provides improved solids removal efficiency; (6) improves laminar flow within the separation vessel; (7) reduces discharge water velocity from a separation vessel; (8) improves dwell time within the separation vessel; (9) provides for adjustable height risers to control system liquid level; and, (10) improves overall efficiency and cost effectiveness.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 28 shows an end view of a receiving weir of a third embodiment.

FIG. 29 shows a perspective view of a fourth embodiment.

FIG. 30 shows an opposite perspective view of a fourth embodiment.

FIG. 33 shows an end view of a receiving weir of a fourth embodiment.

FIG. 34 shows a perspective view of an effluent weir of a fourth embodiment.

FIG. 35 shows an end view of an effluent weir of a fourth embodiment.

REFERENCE NUMBERS USED IN DRAWINGS

Figure 1:
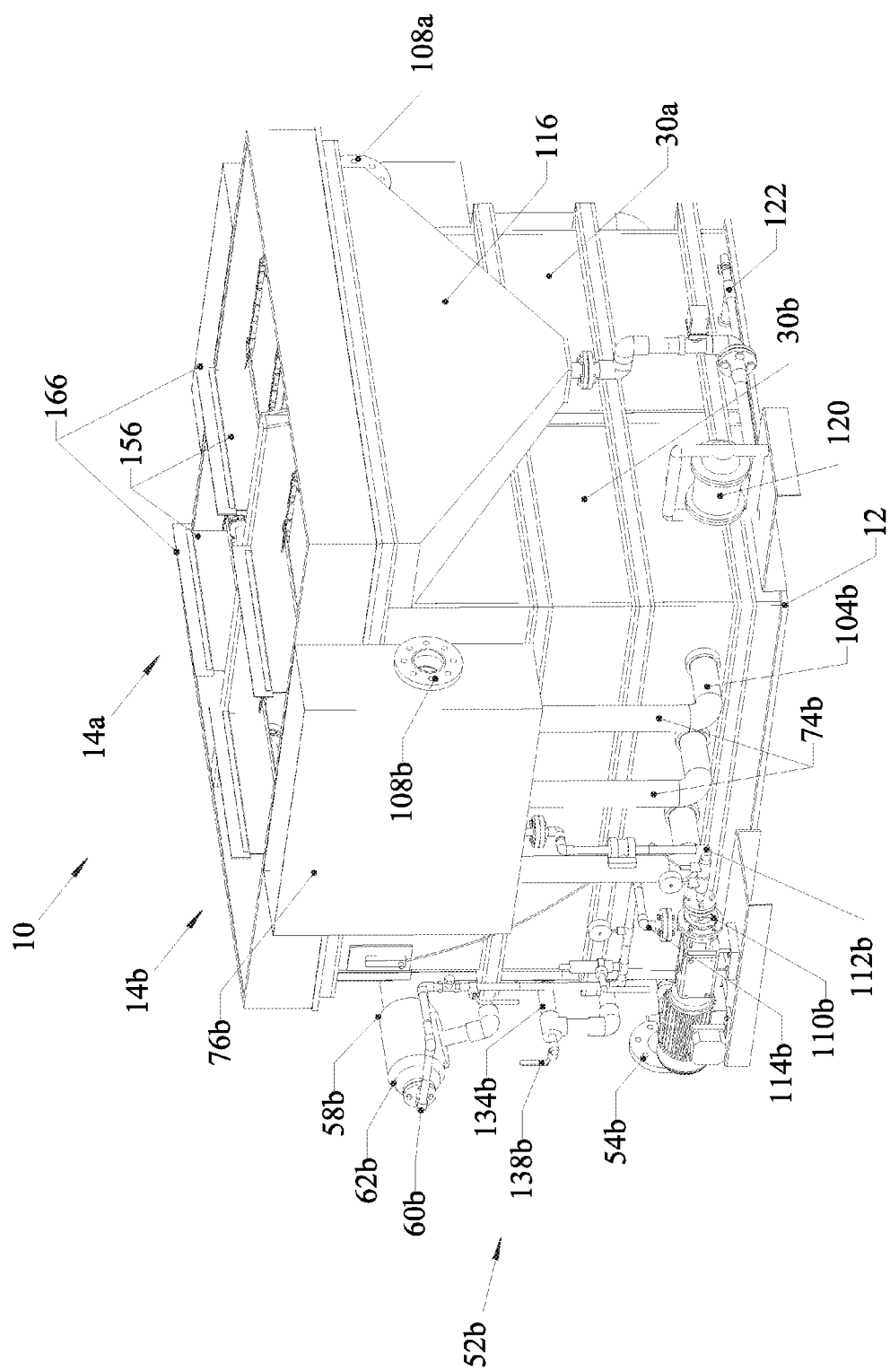
FIG. 1 shows a perspective view of the back end of a first embodiment.

Turning now descriptively to the drawings, in which similar reference characters denote similar elements throughout the several views, the figures illustrate the modular dual vessel dissolved aeration flotation waste water treatment system of the present invention. With regard to the reference numerals used, the following numbering is used throughout the various drawing figures:

10 First embodiment
12 Frame
14ab Treatment section
16 Surface skimmer
18 Sludge collection section
20ab Separation tank
22ab Separation tank bottom wall
24ab Separation tank first end wall
26ab Separation tank first end wall bottom portion
28ab Separation tank first end wall top portion
30ab Separation tank second end wall
32ab Separation tank second end wall bottom portion
34ab Separation tank second end wall top portion 36*ab* Separation tank inside side wall
36 Common separation tank inside side wall
38*ab* Separation tank outside side wall
40*ab* Separation tank inside sidewall bottom portion
42*ab* Separation tank inside sidewall top portion
44*ab* Separation tank outside sidewall bottom portion
46*ab* Separation tank outside sidewall top portion
48*ab* Sludge plate
50*ab* Sludge plate incline angle
52*ab* Flocculator portion
54*ab* Flocculator inlet
56*ab* Flocculator discharge
58*ab* Flocculator aeration mixing chamber
60*ab* Flocculator aeration injection port
62*ab* Flocculator aeration mixing chamber upstream end
64*ab* Flocculator chemical injection port
66*ab* Effluent weir
68*ab* Effluent weir top portion
70*ab* Effluent weir bottom inlet
72*ab* Effluent weir discharge
74*ab* Clear well riser
76*ab* Clear well
78*ab* Clear well bottom wall
80*ab* Clear well side wall
82*ab* Clear well side wall
84*ab* Clear well side wall
86*ab* Clear well side wall
88*ab* Clear well side wall bottom portion
90*ab* Clear well side wall top portion
92*ab* Clear well side wall bottom portion
94*ab* Clear well side wall top portion
96*ab* Clear well side wall bottom portion
98*ab* Clear well side wall top portion
100*ab* Clear well side wall bottom portion
102*ab* Clear well side wall top portion
104*ab* Clear well riser bottom portion
106*ab* Clear well riser discharge
108*ab* Clear well discharge
110*ab* Aeration injector
112*ab* Aeration injector inlet
114*ab* Aeration injector discharge
116 Sludge hopper
118 Sludge hopper end wall
120 Sludge pump
122*ab* Separator plate pack
124*ab* Separator plate
126*ab* Separator plate top edge
132*ab* Flocculator first stage
134*ab* Flocculator second stage
136*ab* Flocculator third stage
138*ab* Flocculator second stage chemical injection port
140*ab* Flocculator third stage chemical injection port
142*ab* Effluent weir apex
144*ab* Effluent weir closed end
146*ab* Effluent weir dead space
148*ab* Aeration turbine pump supply line
150 First cyclical drive mechanism
152 First cyclical drive mechanism first end
154 First cyclical drive mechanism second end
156 Paddle
158 Second cyclical drive mechanism
160 Second cyclical drive mechanism first end
162 Second cyclical drive mechanism second end
164 Paddle rigid coupling flange
166 Paddle flexible wiper
168 Paddle first wing flange
170 Paddle second wing flange
172 Chain
174 Drive sprocket
176 Common drive shaft
178 idler sprocket
180 Common idler shaft
182 Drive mechanism common drive motor
184*ab* Clear well riser grooves
186*ab* Sealing members
188*ab* Separable riser discharge member
190*ab* Set screw
192*ab* Dimples
194*ab* Clear well riser top end
1010 Second embodiment
1012 Frame
1014*ab* Treatment section
1016 Surface skimmer
1018 Sludge collection section
1020*ab* Separation tank
1022*ab* Separation tank bottom wall
1024*ab* Separation tank first end wall
1026*ab* Separation tank first end wall bottom portion
1028*ab* Separation tank first end wall top portion
1030*ab* Separation tank second end wall
1032*ab* Separation tank second end wall bottom portion
1034*ab* Separation tank second end wall top portion
1036*ab* Separation tank inside side wall
1036 Common separation tank inside side wall
1038*ab* Separation tank outside side wall
1040*ab* Separation tank inside sidewall bottom portion
1042*ab* Separation tank inside sidewall top portion
1044*ab* Separation tank outside sidewall bottom portion
1046*ab* Separation tank outside sidewall top portion
1048*ab* Sludge plate
1050*ab* Sludge plate incline angle
1052*ab* Flocculator portion
1054*ab* Flocculator inlet
1056*ab* Flocculator discharge
1058*ab* Flocculator aeration mixing chamber
1060*ab* Flocculator aeration injection port
1062*ab* Flocculator aeration mixing chamber upstream end
1064*ab* Flocculator chemical injection port
1066*ab* Effluent weir
1074*ab* Clear well riser
1076*ab* Clear well
1104*ab* Clear well riser bottom portion
1106*ab* Clear well riser discharge
1108*ab* Clear well discharge
1110*ab* Aeration injector
1112*ab* Aeration injector inlet
1114*ab* Aeration injector discharge
1116 Sludge hopper
1118 Sludge hopper end wall
1120 Sludge pump
1128*ab* Stilling well
1130*ab* Stilling well drain
1132*ab* Flocculator first stage
1134*ab* Flocculator second stage
1138*ab* Flocculator second stage chemical injection port
1148*ab* Aeration turbine pump supply line
1150 First cyclical drive mechanism
1156 Paddle
1158 Second cyclical drive mechanism
1164 Paddle rigid coupling flange
1166 Paddle flexible wiper
1172 Chain
1174 Drive sprocket
1176 Common drive shaft 1182 Drive mechanism common drive motor
L Operating liquid level
2010 Third Embodiment
2012 Frame
2066 Receiving weir
2068 Receiving weir top portion
2070 Receiving weir bottom inlet
2074a Clear well riser
2074b Clear well riser
2074c Clear well riser
2076a Clear well
2078 Clear well bottom wall
2080 Clear well side walls
2088 Clear well side wall bottom portions
2090 Clear well side wall top portions
2104a Clear well riser bottom portion
2104b Clear well riser bottom portion
2104c Clear well riser bottom portion
2106a Clear well riser discharge
2106b Clear well riser discharge
2106c Clear well riser discharge
2142 Receiving weir top portion apex
2200 Receiving weir lateral side
2204a Receiving weir cutout
2204b Receiving weir cutout
2204c Receiving weir cutout
3010 Fourth Embodiment
3012 Frame
3066 Receiving weir
3068 Receiving weir top portion
3070 Receiving weir bottom inlet
3074a Clear well riser
3074b Clear well riser
3074c Clear well riser
3076a Clear well
3078 Clear well bottom wall
3080 Clear well side walls
3088 Clear well side wall bottom portions
3090 Clear well side wall top portions
3104a Clear well riser bottom portion
3104b Clear well riser bottom portion
3104c Clear well riser bottom portion
3106a Clear well riser discharge
3106b Clear well riser discharge
3106c Clear well riser discharge
3142 Receiving weir top portion apex
3184 First effluent weir
3186 Second effluent weir
3188 First effluent weir second end
3190 Second effluent weir second end
3192 First effluent weir top portion
3194 Second effluent weir top portion
3196 First effluent weir bottom inlet
3198 Second effluent weir bottom inlet
3200 Receiving weir first lateral side
3202 Receiving weir second lateral side
3204a Receiving weir cutout
3204b Receiving weir cutout
3204c Receiving weir cutout
3206 First effluent weir first end
3208 First effluent weir first end
3210 Receiving weir cutout
3212 Receiving weir cutout
3214a Receiving weir cutout
3214b Receiving weir cutout
3214c Receiving weir cutout

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

For ease of reference, because the first and second treatment sections have duplicate portions, items relating to a first treatment section will be designated with an "a" suffix, and duplicate items relating to a second treatment section will be designated with a "b" suffix. For example, reference to "separation tank 20ab" indicates that both treatment sections 14a and 14b include an identical separation tank 20a and 20b, respectively.

Referring to FIGS. 1-16, a first embodiment of an improved effluent weir system is shown installed in a DAF system 10, the DAF system including a frame 12; first and second treatment sections 14a and 14b, respectively, mounted to frame 12 adjacent to each other. Each treatment section includes a separation tank 20ab, a sludge plate 48ab, a flocculator portion 52ab, an effluent weir 66ab, a clear well 74ab, a clear well riser 76ab, an aeration injector 110ab, a surface skimmer 16, and a sludge collection section 18. In the first embodiment, separation tank 20ab has a volume defined by a bottom wall 22ab, opposing first and second end walls 24ab and 30ab, respectively, each extending from a bottom portion 26ab and 32ab, respectively, connected to the bottom wall 22ab to a top portion 26ab and 34ab, respectively, and opposing parallel inside and outside side walls 36ab and 38ab, respectively, each extending from a bottom portion 40ab and 44ab, respectively, connected to the bottom wall 22ab to a top portion 42ab and 46ab respectively. In the embodiment, bottom wall 22ab may be flat, but may also be slanted downward to facilitate accumulation and removal of sediments. First and second treatment section inside side walls 36a and 36b form a common inside wall section 36. Sludge plate 48ab extends transversely from the inside side wall 36ab to the outside side wall 38ab and extends longitudinally from the interior of the separation tank 20ab at a height below the liquid operating level L of the system 10 to at least the top portion 34ab of the separation tank second end wall 30ab. Sludge plate 48ab is inclined at an angle from horizontal 50ab.

Flocculator portion 52ab includes an inlet 54ab to receive a liquid stream, an outlet 56ab to discharge into the separation tank 20ab, an aeration mixing chamber 58ab disposed between the flocculator inlet 54ab and outlet 56ab, an aeration injection port 60ab proximal to an upstream end 62ab of the aeration mixing chamber 58ab, and a chemical injection port 64ab disposed between the flocculator inlet 54ab and the aeration injection port 60ab.

In the embodiment, effluent weir 66ab is mounted within the separation tank 20ab at a depth proximal to the bottom portions 40ab and 44ab of the inside and outside side walls, respectively, but set off from the bottom wall 22ab. Effluent weir 66ab is mounted low within separation tank 20ab so as to be fully submerged as low as possible to be below the surface region where retentate raised to the surface by gas bubbles accumulates, but still offset from the bottom surface—where non-floating sediment will accumulate—to prevent ingestion of sediment into the clear well. Effluent weir 66ab has an enclosed top portion 68ab and a bottom inlet 70ab to prevent sinking sediments from entering the weir, and a discharge 72ab in fluid communication with a clear well riser 74ab to direct clarified effluent out of the system 10. Clear well 76ab is mounted adjacent to the separation tank 20ab to minimize head loss and footprint. Clear well 76ab is defined by a bottom wall 78ab and enclosing side walls, 80ab, 82ab, 84ab and 86ab, respectively, each clear well side wall 80-86 extending from a bottom portion 88ab, 92ab, 96ab, 100ab, respectively, connected to the clear well bottom wall 78ab to a top portion 90ab, 94ab, 98ab, 102ab, respectively, and further includes a clear well discharge 108ab to discharge clarified effluent for further treatment or reuse.

Clear well riser 74ab extends from a bottom portion 104ab in fluid communication with the effluent weir discharge 72ab to a riser discharge 106ab within the clear well 76ab, wherein the height of the riser discharge 106ab is lower than clear well side wall top portions 90ab, 94ab, 98ab, 102ab, respectively, and defines the liquid operating level L of the system 10.

In the embodiment, a plurality of clear well risers 74ab are provided, each coupled to an individual effluent weir 66ab and discharging into a single clear well 76ab, in order to provide higher volume flow at low water velocity, and to collect flow from throughout the lower portion of separation tank 20ab, thereby maintaining even laminar flow.

Aeration injector 110ab is provided, having an inlet 112ab in fluid communication with the clear well 76ab and a discharge 114ab in fluid communication with the flocculator aeration injection port 60ab.

In the first embodiment, surface skimmer 16 is mounted to the first and second treatment sections 14ab over the tops of separation tanks 20a and 20b. Sludge collection section 18 is adjacent the second end walls 30ab of the first and second treatment sections 14ab to receive retentate from the surface skimmer 16. In the embodiment, sludge collection section 18 includes a sludge hopper 116 which includes a common hopper end wall 118 abutting both treatment section second end walls 30a and 30b. Sludge plates 48a and 48b extend over hopper common end wall 118 to ensure retentate transfers into sludge hopper 116. Sludge collection section 18 includes a sludge pump 120 to transfer collected retentate (aka sludge) for further processing or disposal. In the embodiment sludge pump 120 is an air operated diaphragm pump, but any appropriate pumping system could be used. In the embodiment a separation tank pump down connection 122 is provided with may be selectively aligned to sludge pump 120 so that sludge pump 120 may be used to pump sediment accumulated on separation tank bottom walls 22ab.

First treatment section 14a and second treatment section 14b may operate independently of each other, such that they may be run simultaneously in parallel aligned to a common waste stream, or one section may be operating while the other side is idle, or they may be aligned to separate waste streams with different flocculator chemistry and/or aeration injection settings used, different dwell times, and discharging clean effluent from their respective clear wells 74ab to different destinations. In addition, first and second treatment sections 14a and 14b may be aligned in series, such that the effluent discharge 108ab of one section's clear well 74ab feeds into the inlet 52ab of the other section.

Figure 14:
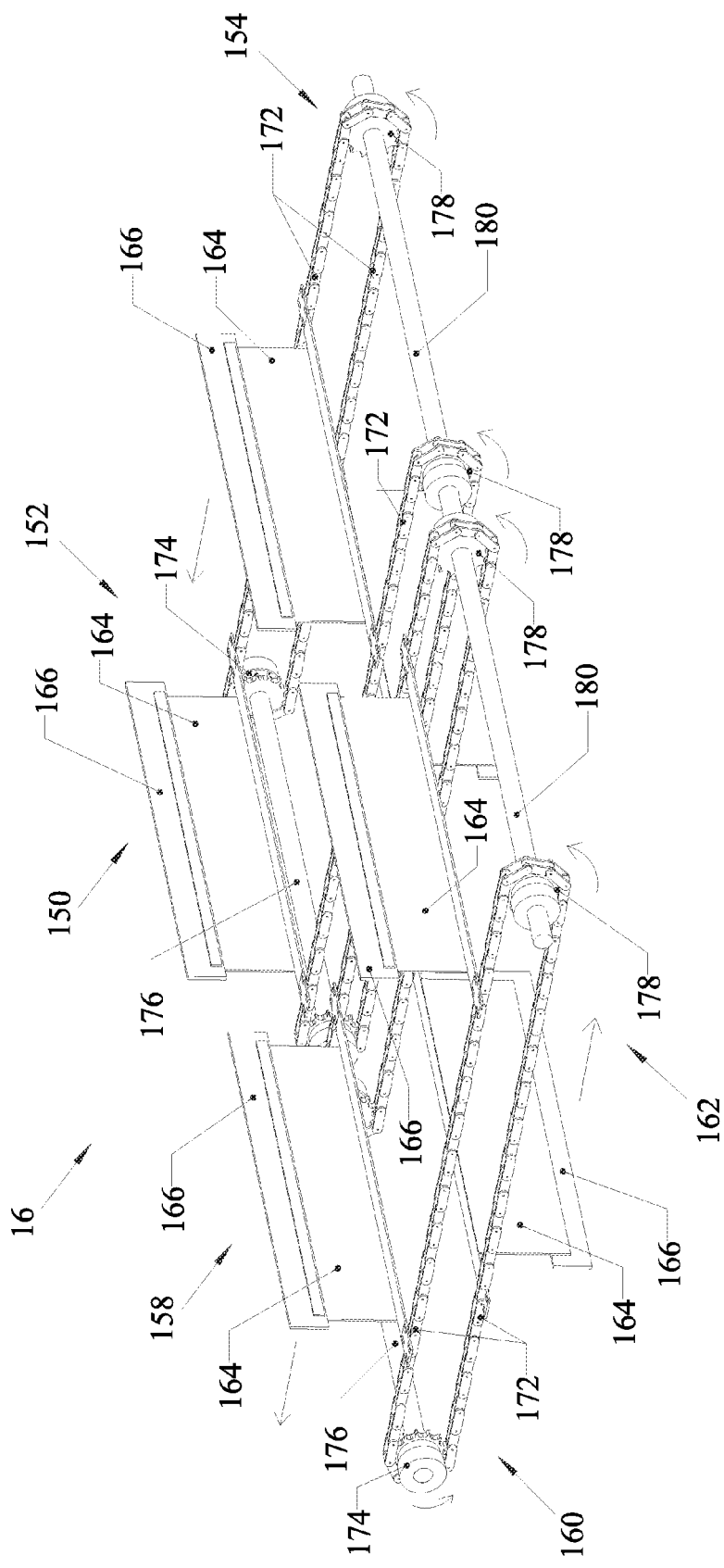
FIG. 14 shows a perspective view of a surface skimmer of a first embodiment.
Figure 15:
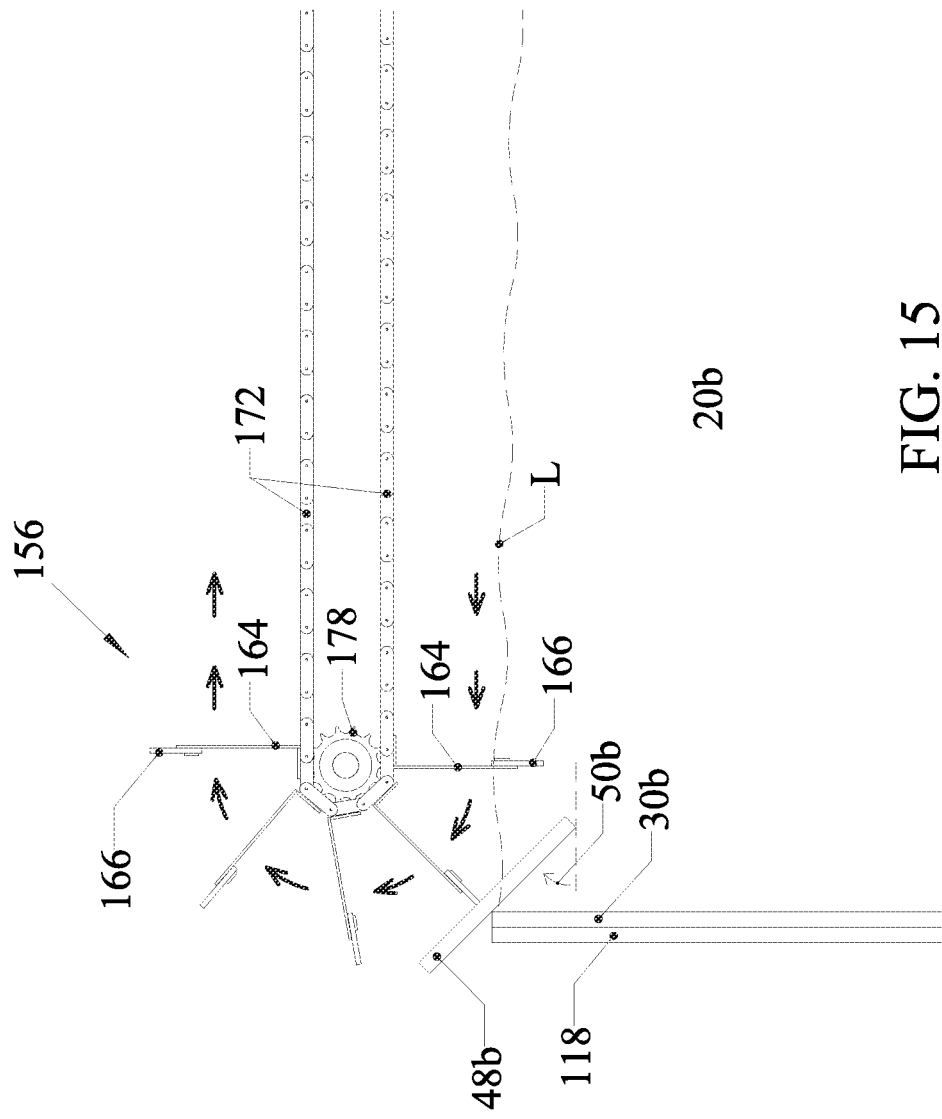
FIG. 15 shows a side view of the back end of a surface skimmer of a first embodiment.
Figure 16:
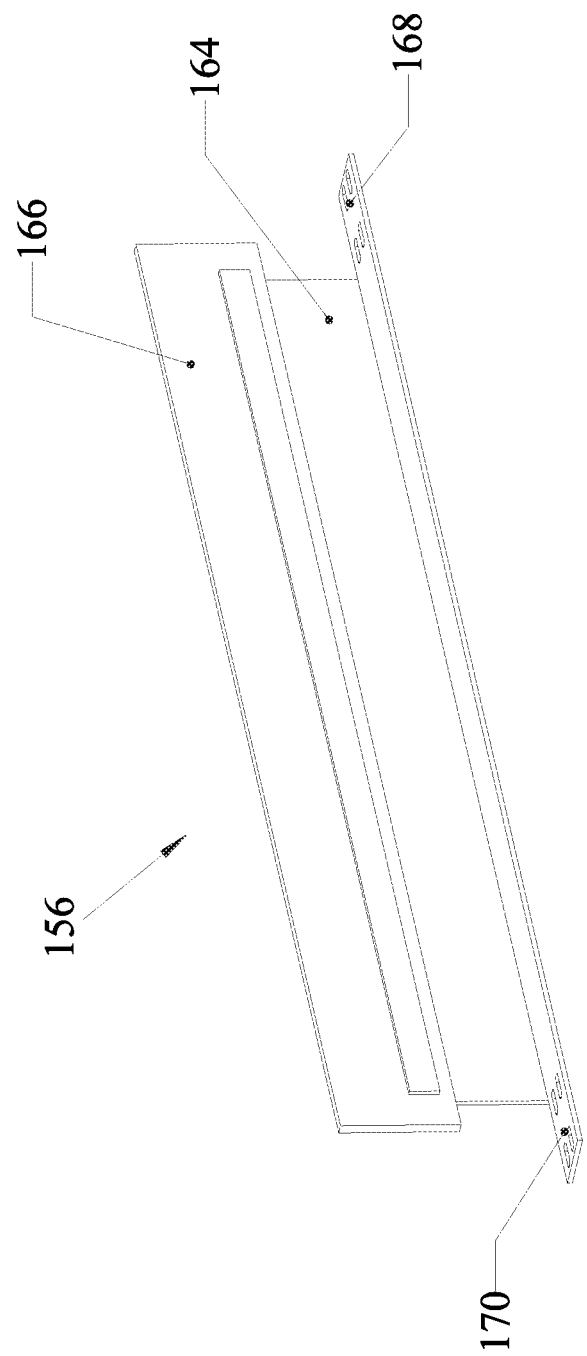
FIG. 16 shows a perspective view of a skimmer paddle of a first embodiment.
Figure 17:
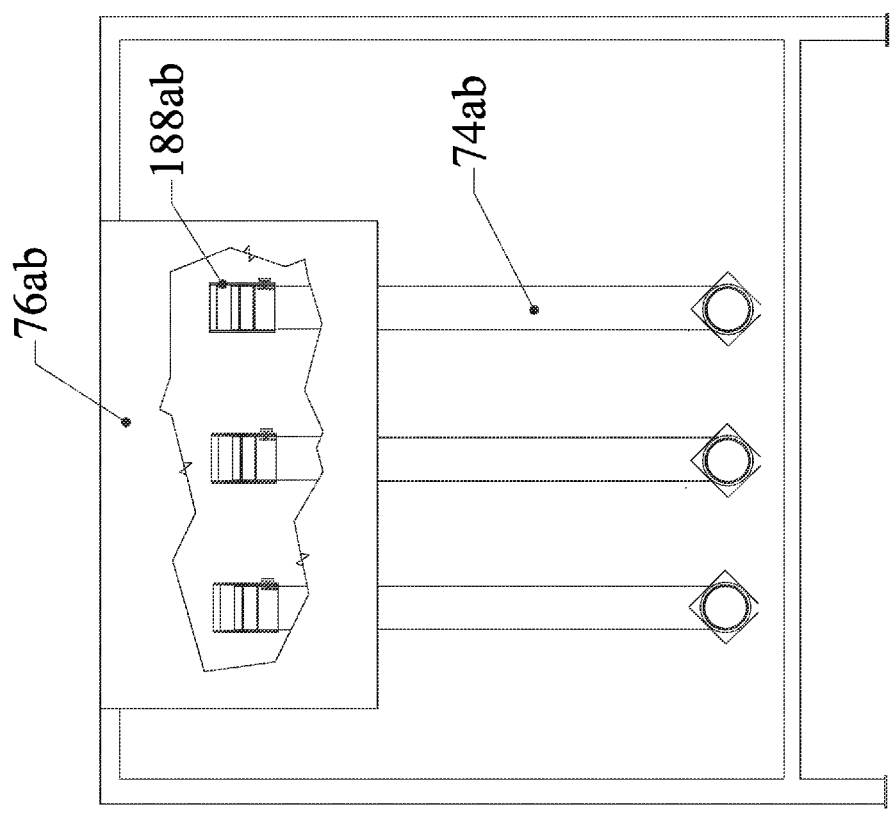
FIG. 17 shows a cutaway side view of an adjustable height riser of a first embodiment.
Figure 18:
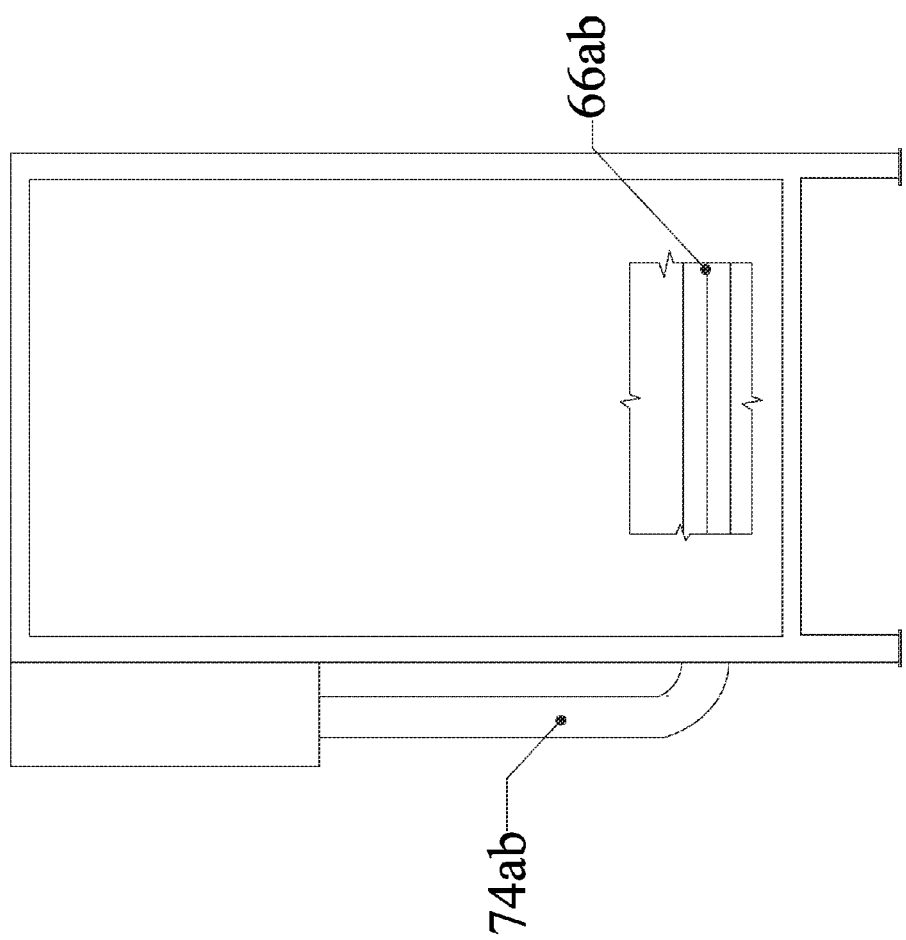
FIG. 18 shows a cutaway front view of an effluent weir and clear well of a first embodiment.
Figure 19:
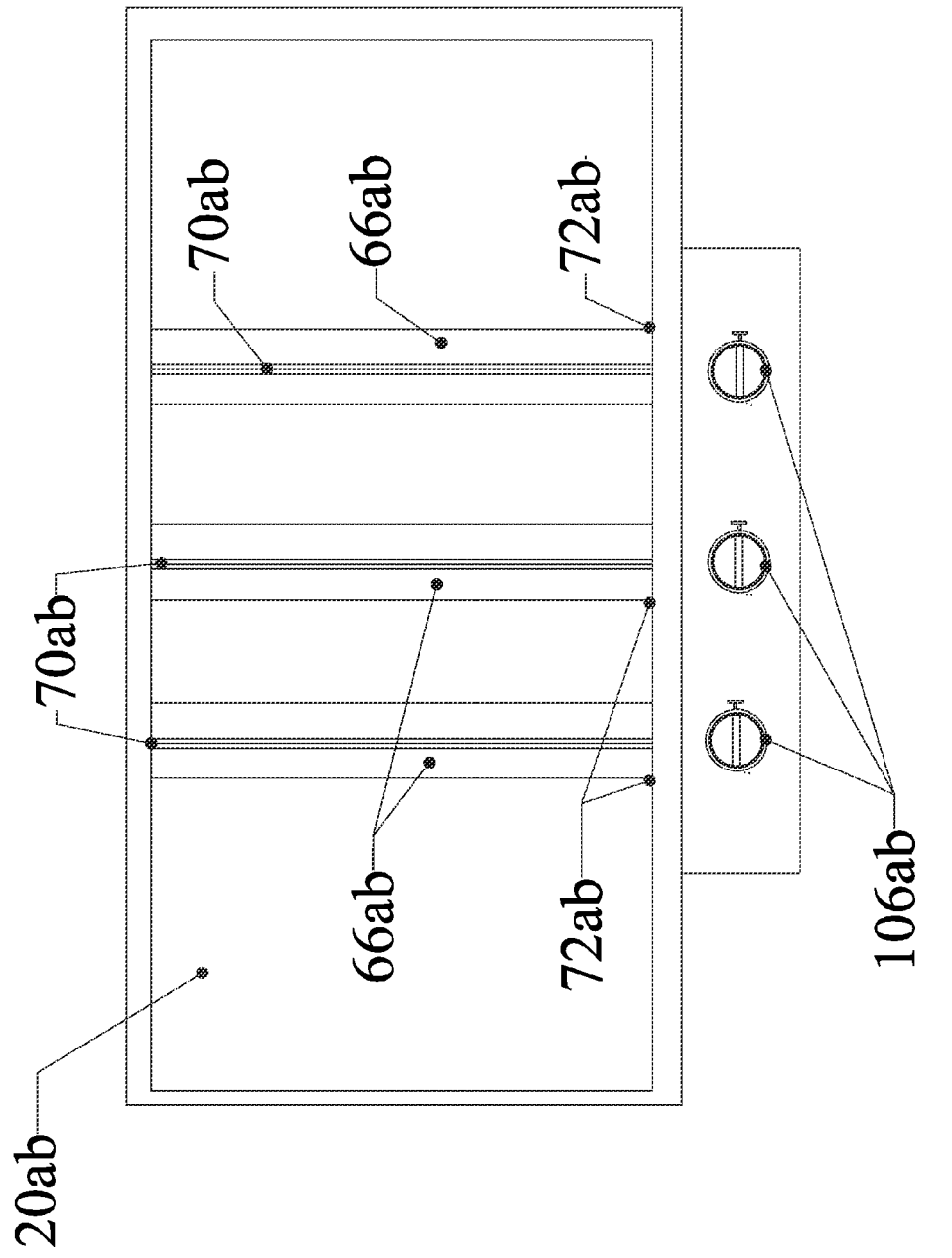
FIG. 19 shows an overhead view of effluent weirs and a clear well of a first embodiment.
Figure 20:
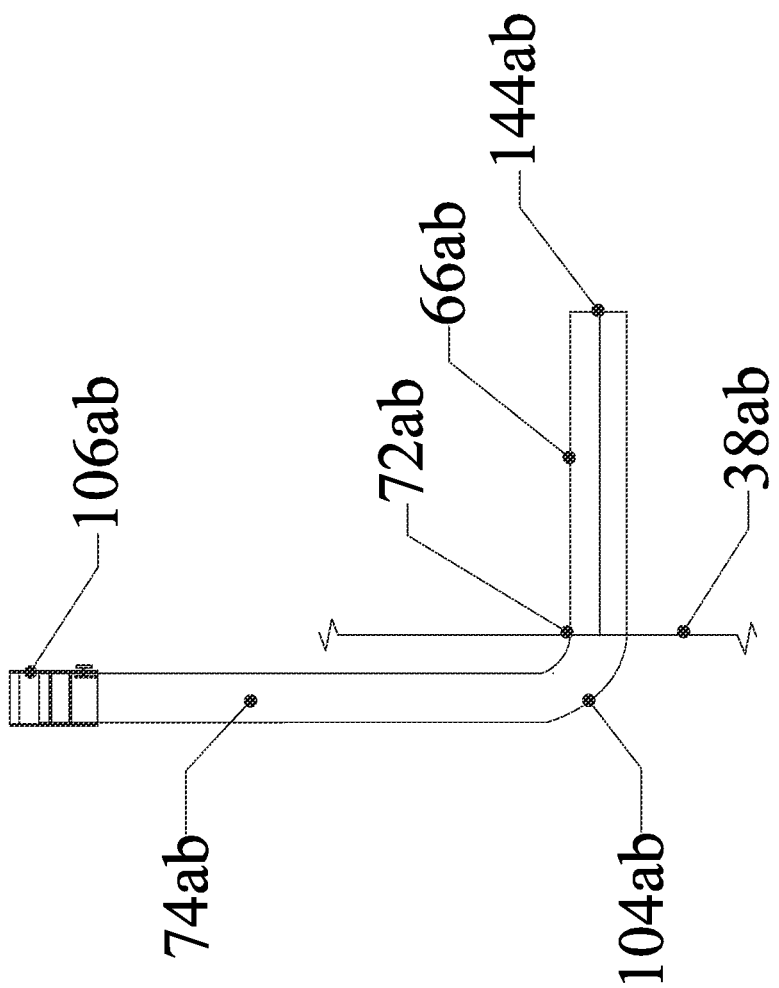
FIG. 20 shows an isolated front view of an effluent weir, adjustable riser and clear well of a first embodiment.
Figure 20A:
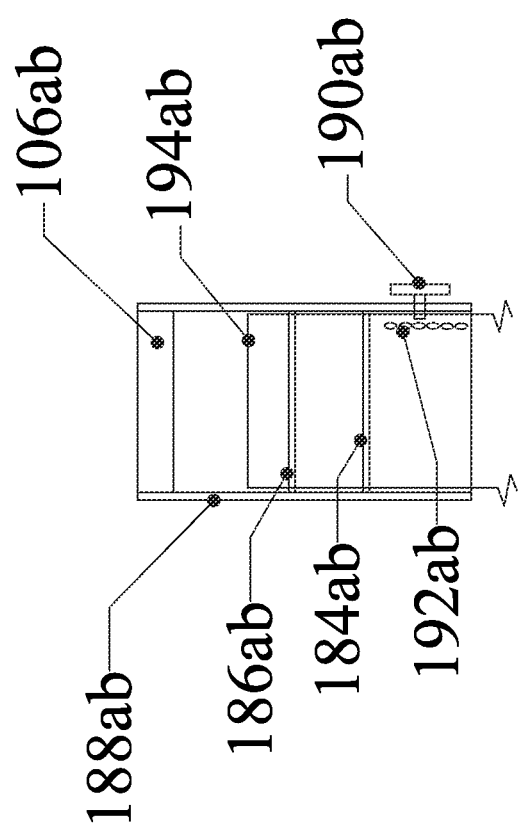
FIG. 20A shows detail cutaway view of an adjustable height riser of a first embodiment.
Figure 20B:
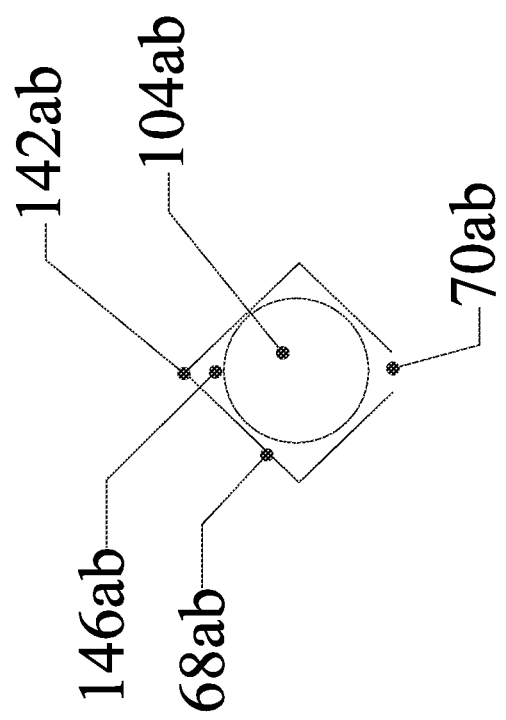
FIG. 20B shows a detail view of a riser coupled to an effluent weir of a first embodiment.
Figure 21:
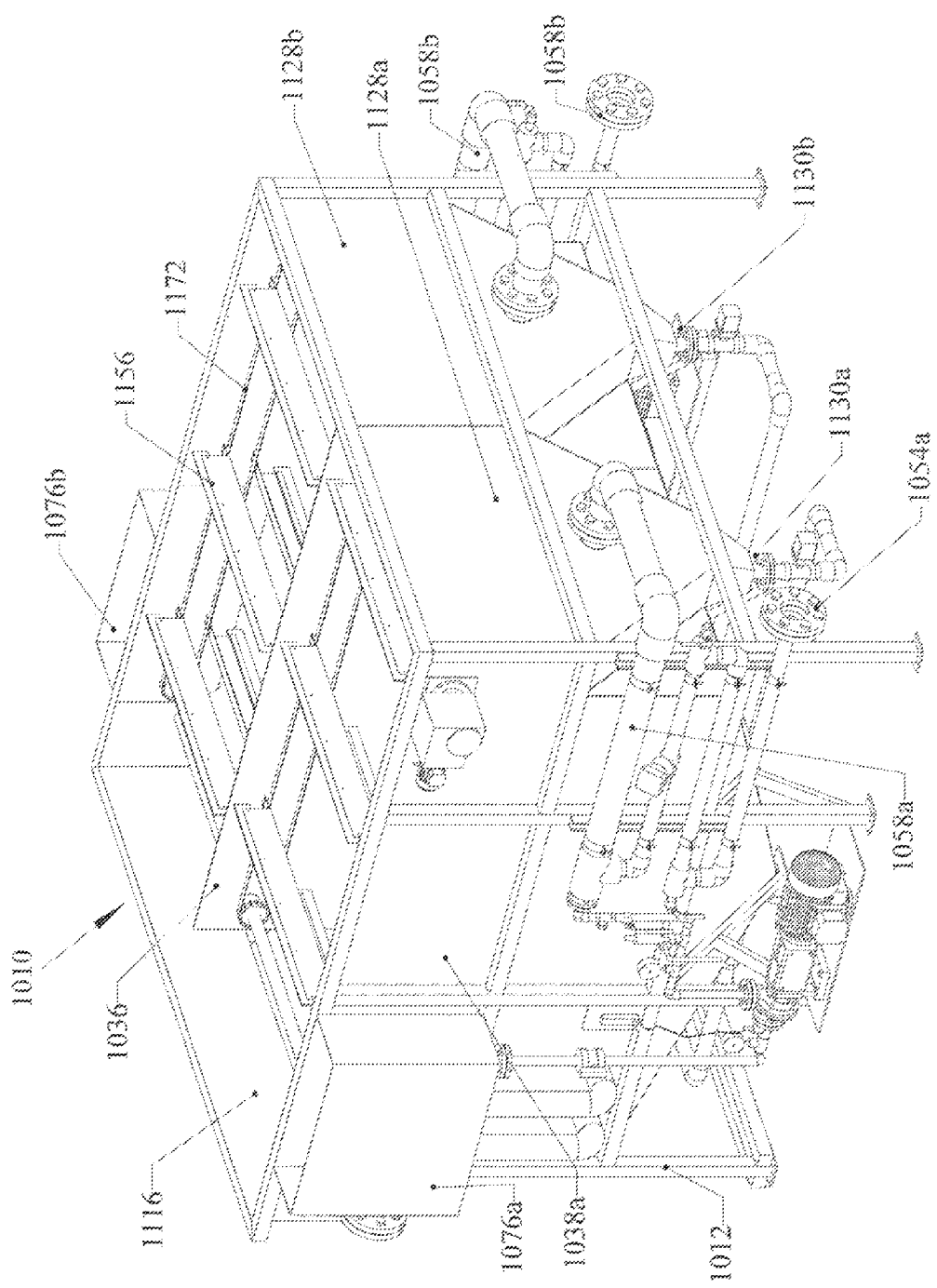
FIG. 21 shows an overhead perspective view of a second embodiment.
Figure 22:
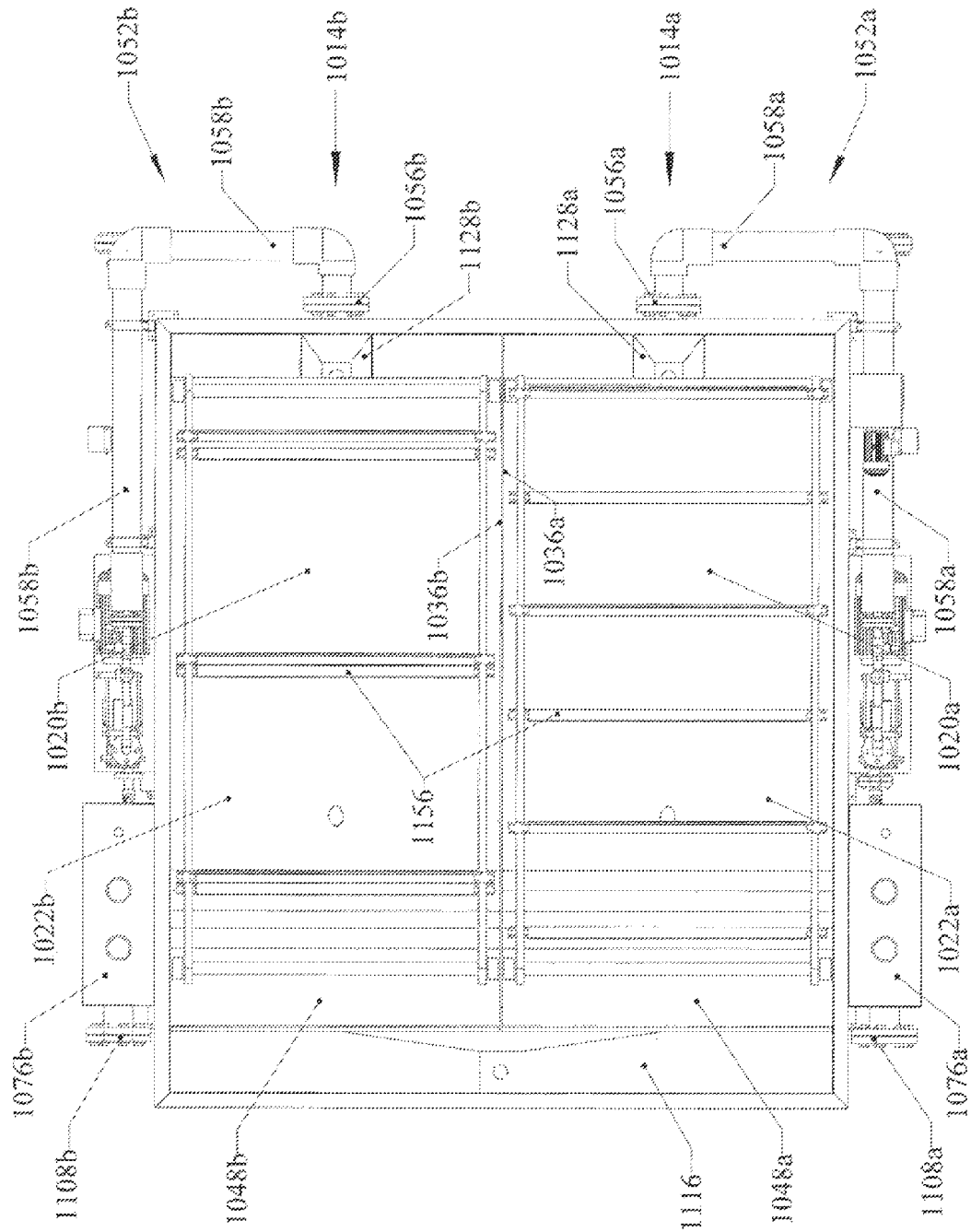
FIG. 22 shows a plan view of a second embodiment.
Figure 23:
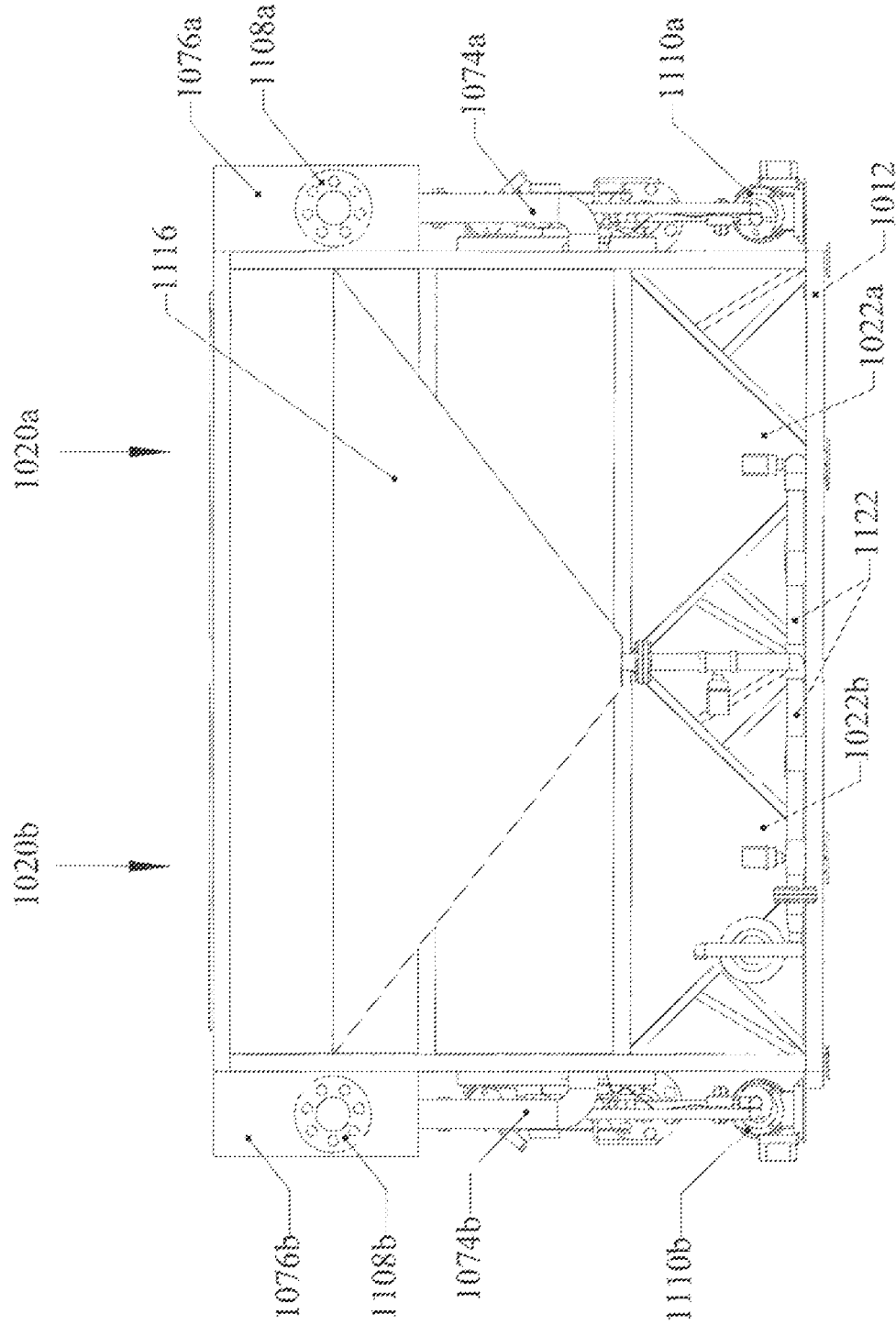
FIG. 23 shows a front elevation view of a second embodiment.
Figure 24:
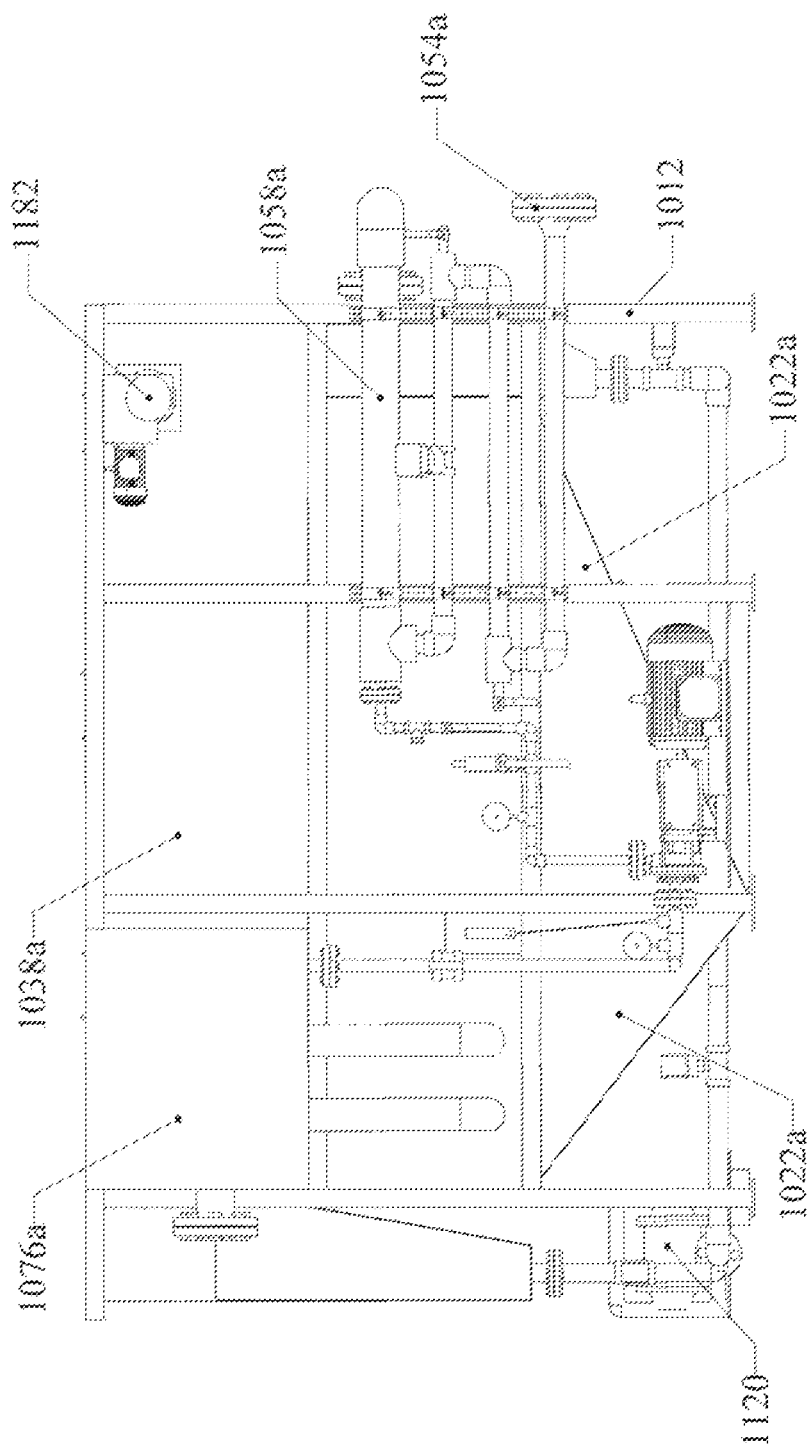
FIG. 24 shows a side elevation view of a second embodiment.
Figure 25:
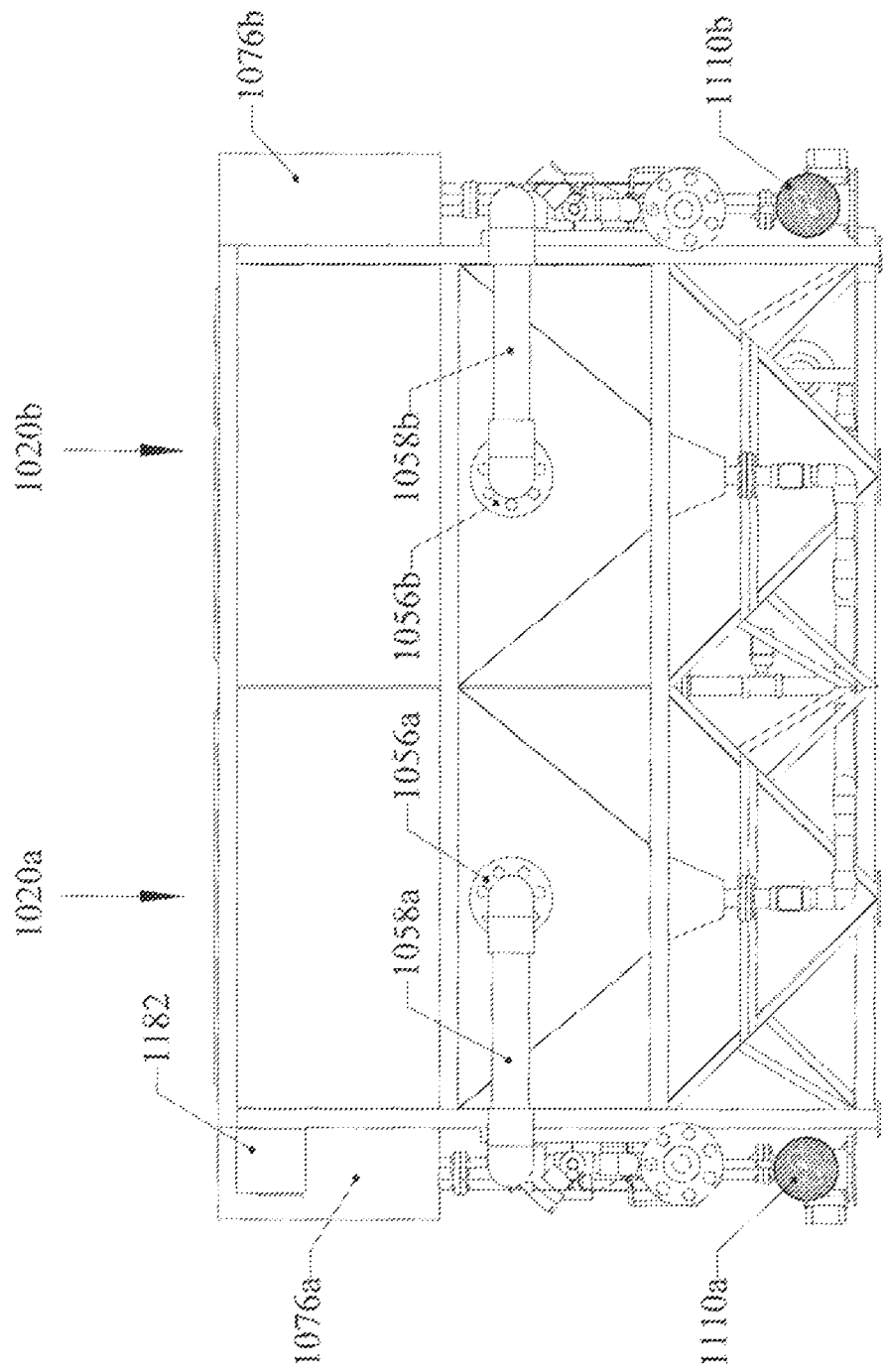
FIG. 25 shows rear elevation view of a second embodiment.

Referring to FIGS. 14-16, the angle 50ab of each sludge plate 48ab is preferably in the range of 30° to 50° pitch, inclined away from separation tank first end wall 24ab and toward sludge collection section 18, so that surface skimmer 16 can easily push retentate up and over into sludge hopper 116 while minimizing the amount of water lost.

Referring to FIGS. 5, 6, 8 and 9, first and second separation tank inside side walls 36a and 36b form a common inside side wall 36. In the embodiment, first and second inside side walls 36a and 36b are joined parallel plates with an air gap separating them of approximately 2 to 4 inches (50 to 100 mm), to prevent leakage between tanks and to provide a leak detection space.

Referring to FIGS. 5-9, a first embodiment includes a separator tank plate pack 122ab mounted within separation tank 20ab, the separator plate pack 122ab including a plurality of spaced apart parallel plates 124ab oriented at a non-vertical angle, preferably in the range of 45° to 65° pitch, and having their top edges 126ab below the level of the skimmer 16. The plate pack 122ab provides additional separation efficiency by enhancing laminar flow, and providing increased surface area to cause particle agglomeration and bubble adherence, so that heavier particles and lighter flocculate separate, the heavier particles sinking more quickly and the lighter particles rising to the surface to be skimmed off.

Figure 2:
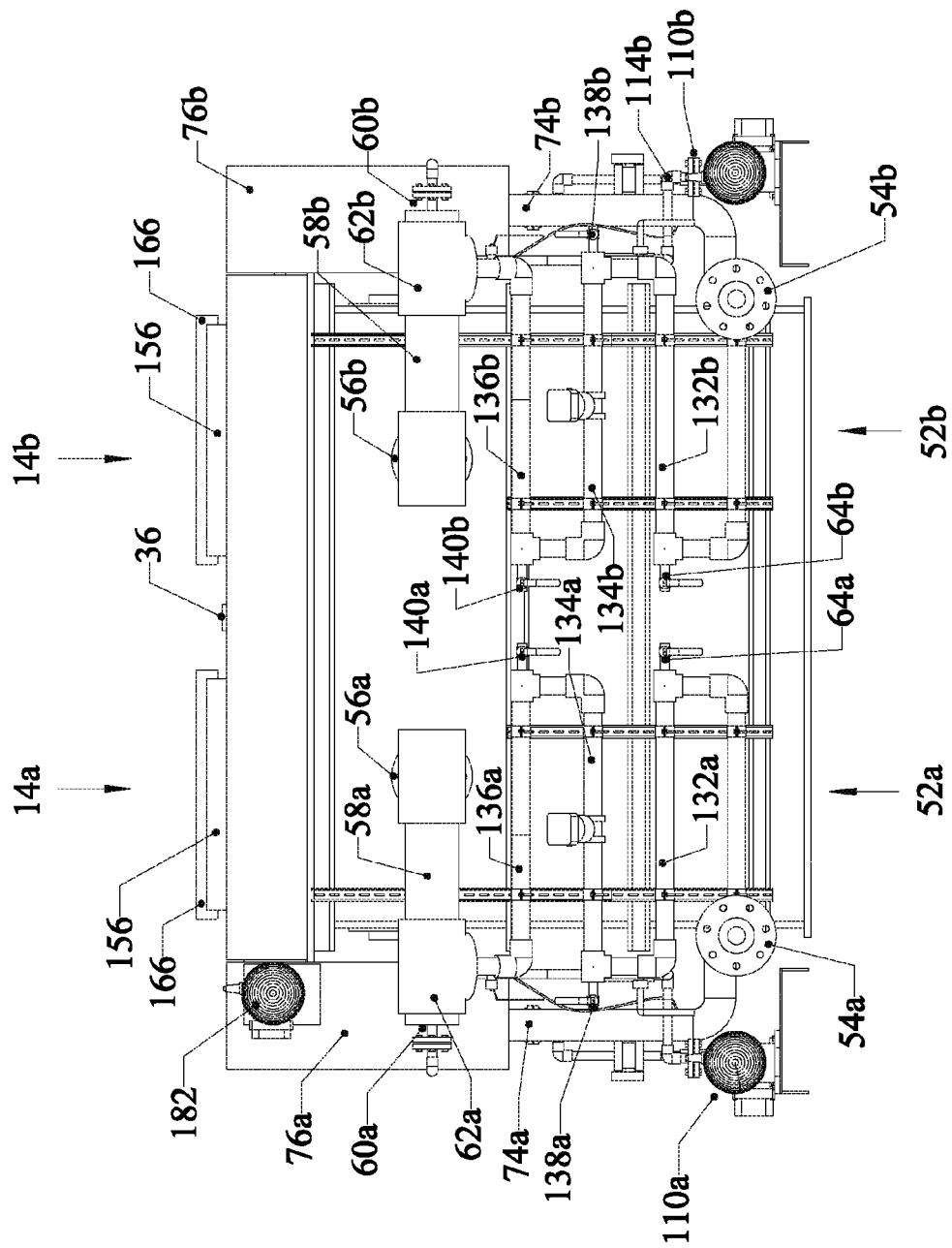
FIG. 2 shows a front end elevation view of a first embodiment.
Figure 3:
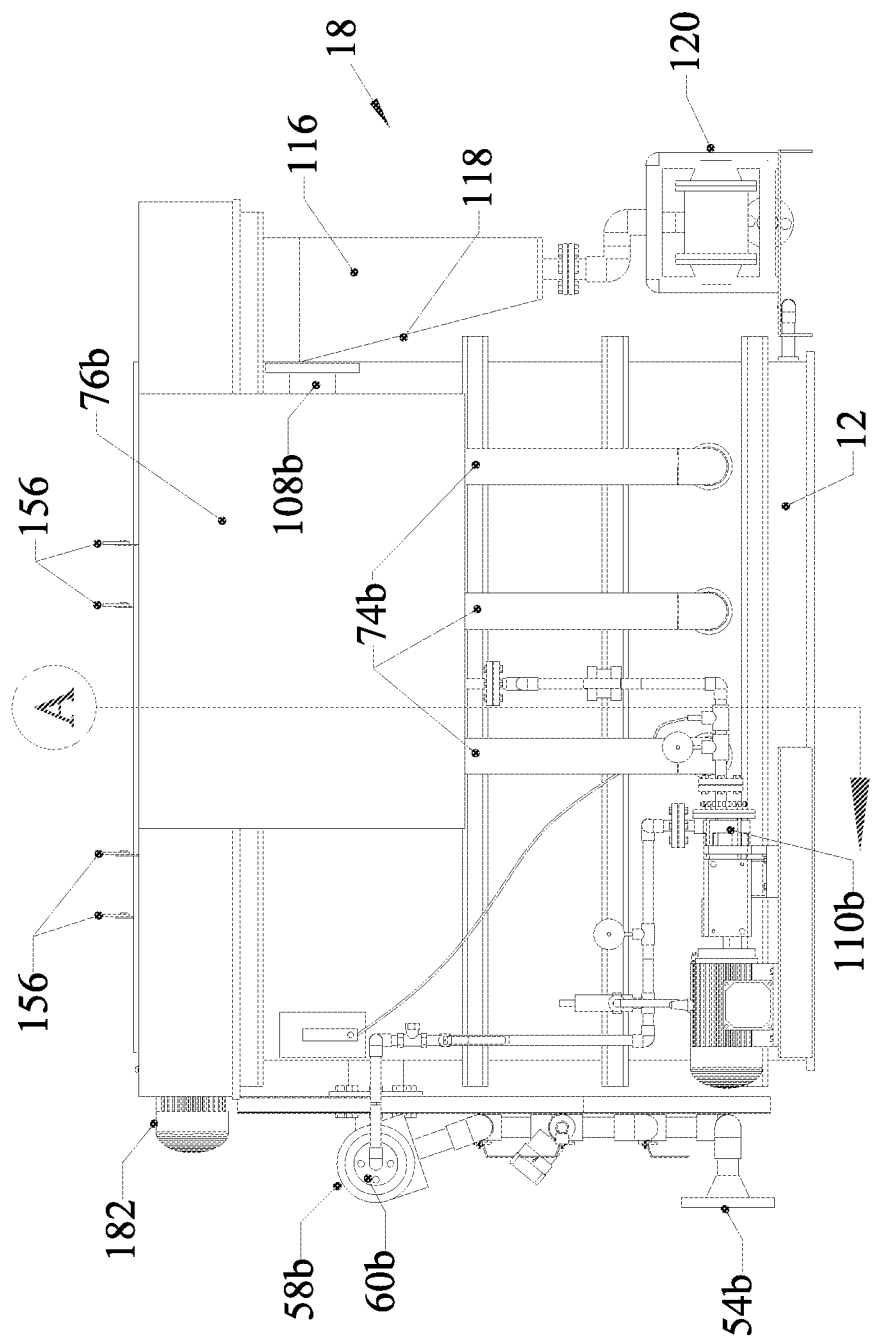
FIG. 3 shows a side elevation view of a first embodiment.
Figure 4:
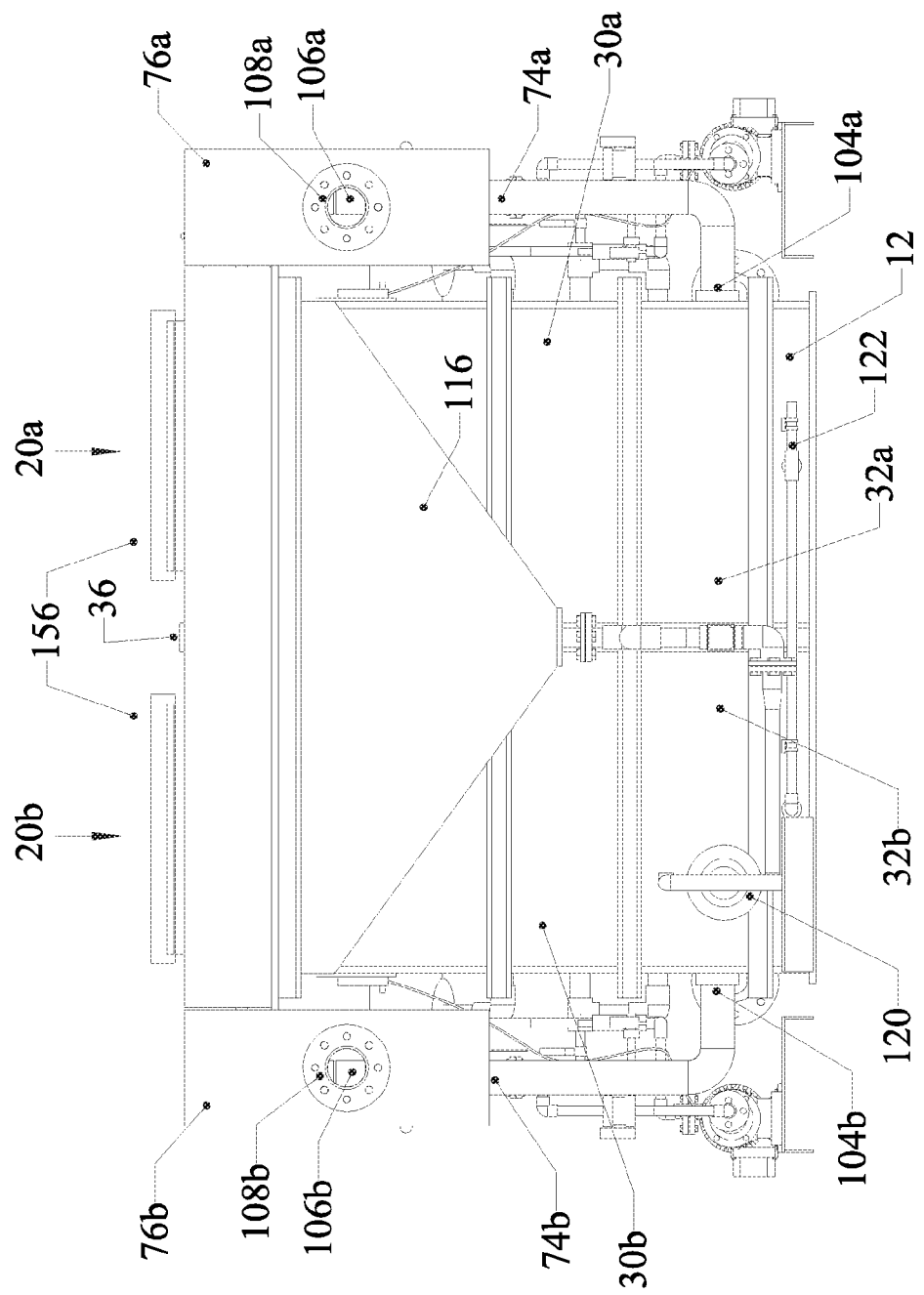
FIG. 4 shows a back end elevation view of a first embodiment.
Figure 5:
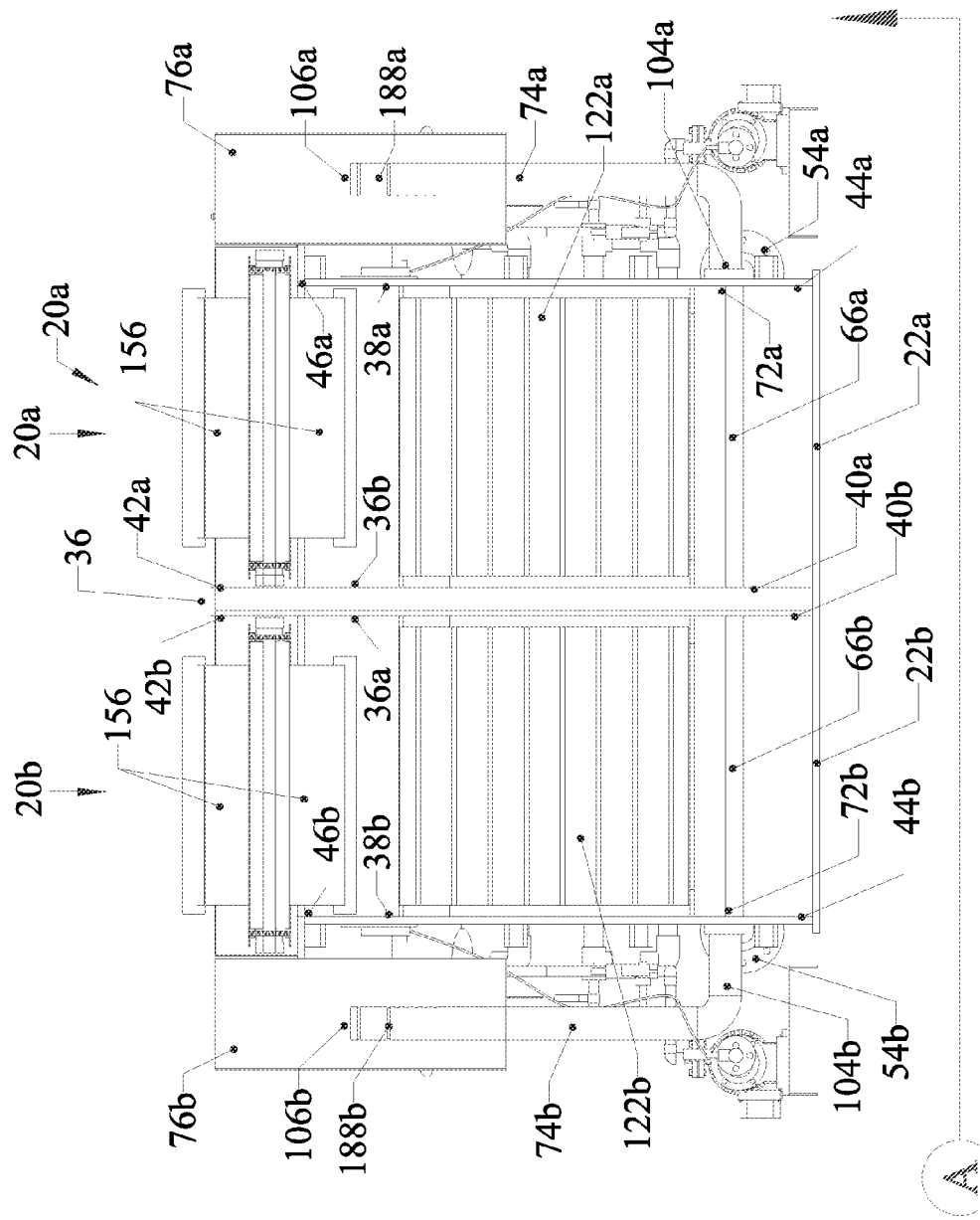
FIG. 5 shows a cutaway view of a first embodiment.

Referring to FIG. 2, in the first embodiment, each flocculator portion 52ab includes a plurality of stages 132ab, 134ab and 136ab in series. In the embodiment, each stage 132ab, 134ab and 136ab, respectively, comprises a horizontal pipe run having a chemical injection port 64ab, 138ab and 140ab, respectively, located proximal to its upstream end. The aeration injection port 60ab is located downstream of the final chemical injection port 140ab and immediately prior to the aeration mixing chamber 58ab, so that the chemicals are mixed prior to injection of air saturated water. Chemical injection ports 132ab, 134ab and 136ab may also be used for sampling or as clean out ports during maintenance. The multistage flocculator portion 52ab may be used to inject different flocculate agents at different points, or smaller doses of flocculate agent at different times. Alternatively, the plurality of stages may simply be operated as a single long stage using a single chemical injection port 64ab. Each stage is oriented approximately 180° from the preceding stage, such that the tortuous pathway allows a longer pipe run—and hence longer dwell time within the pipe—in a smaller space, and provides for more thorough mixing. In the embodiment the elongated flocculator portion provides a dwell time of between 5 seconds and 120 seconds, depending on selected flow rates. In the embodiment, aeration mixing chamber 58ab comprises an elongated horizontal pipe section having a larger cross section than each of the plurality of stages 132ab, 134ab or 136ab, and is aligned 180° from the final chemical stage 136ab. Aeration injection port 60ab is positioned at the upstream end of aeration mixing chamber 58*ab* and aligned to inject aerated water in line with the flow of pre-treated water through the aeration mixing chamber 58*ab*.

Figures 6, 6A:
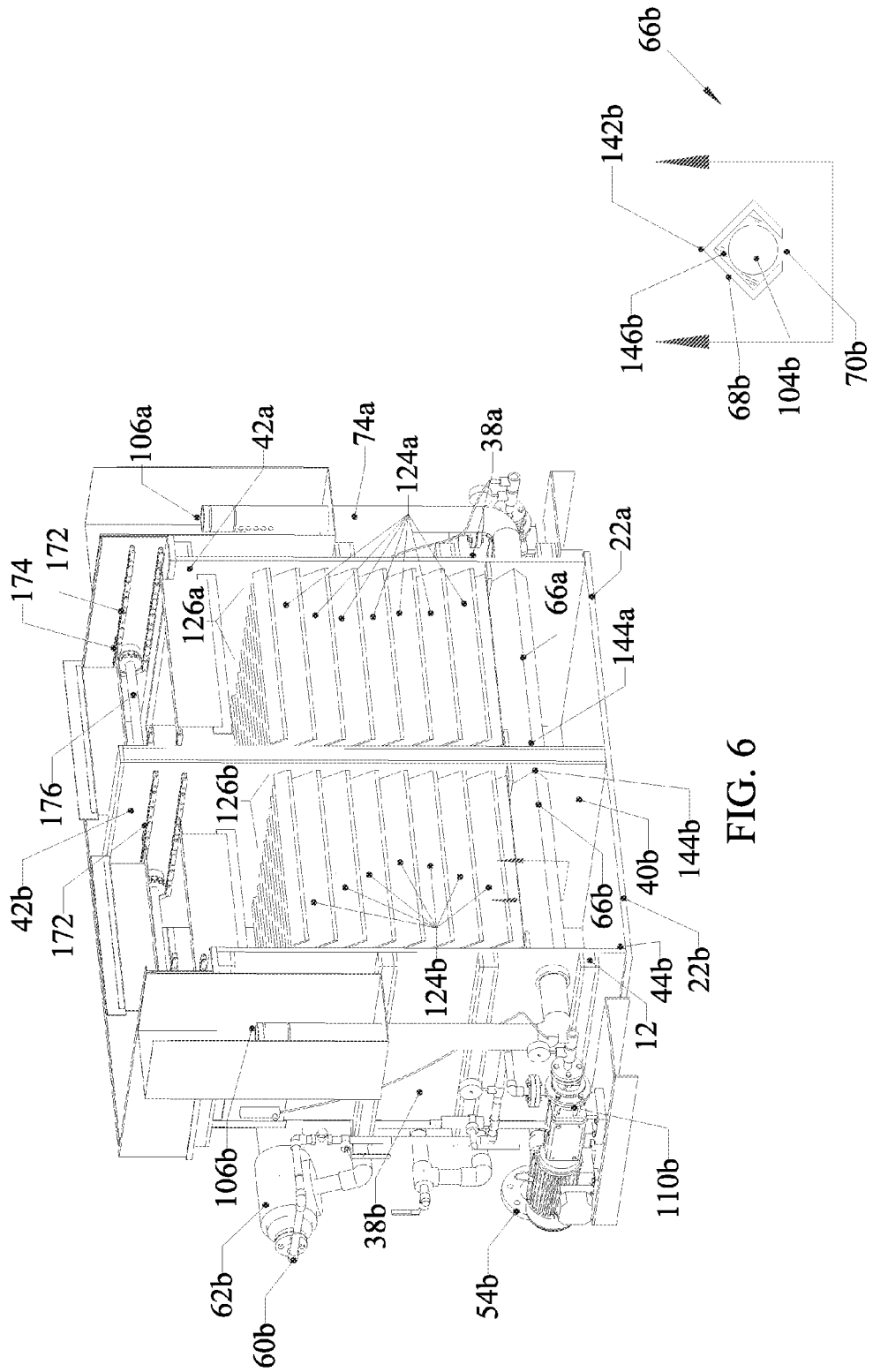
FIG. 6 shows a perspective view of the cutaway view shown in FIG. 5.
FIG. 6A shows a cross section of an angular weir.
Figure 7:
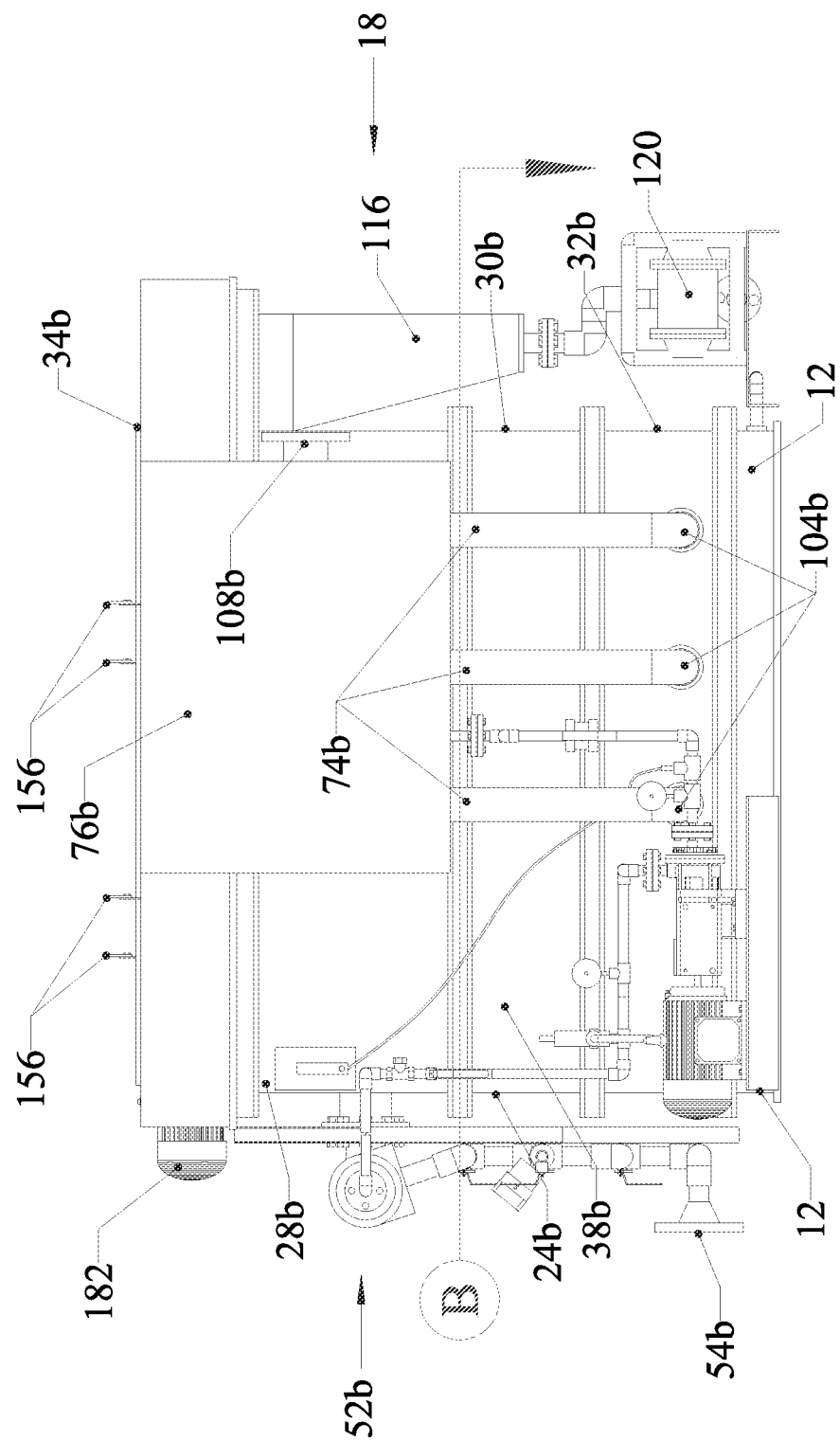
FIG. 7 shows a side elevation view of a first embodiment, as in FIG. 3.
Figure 8:
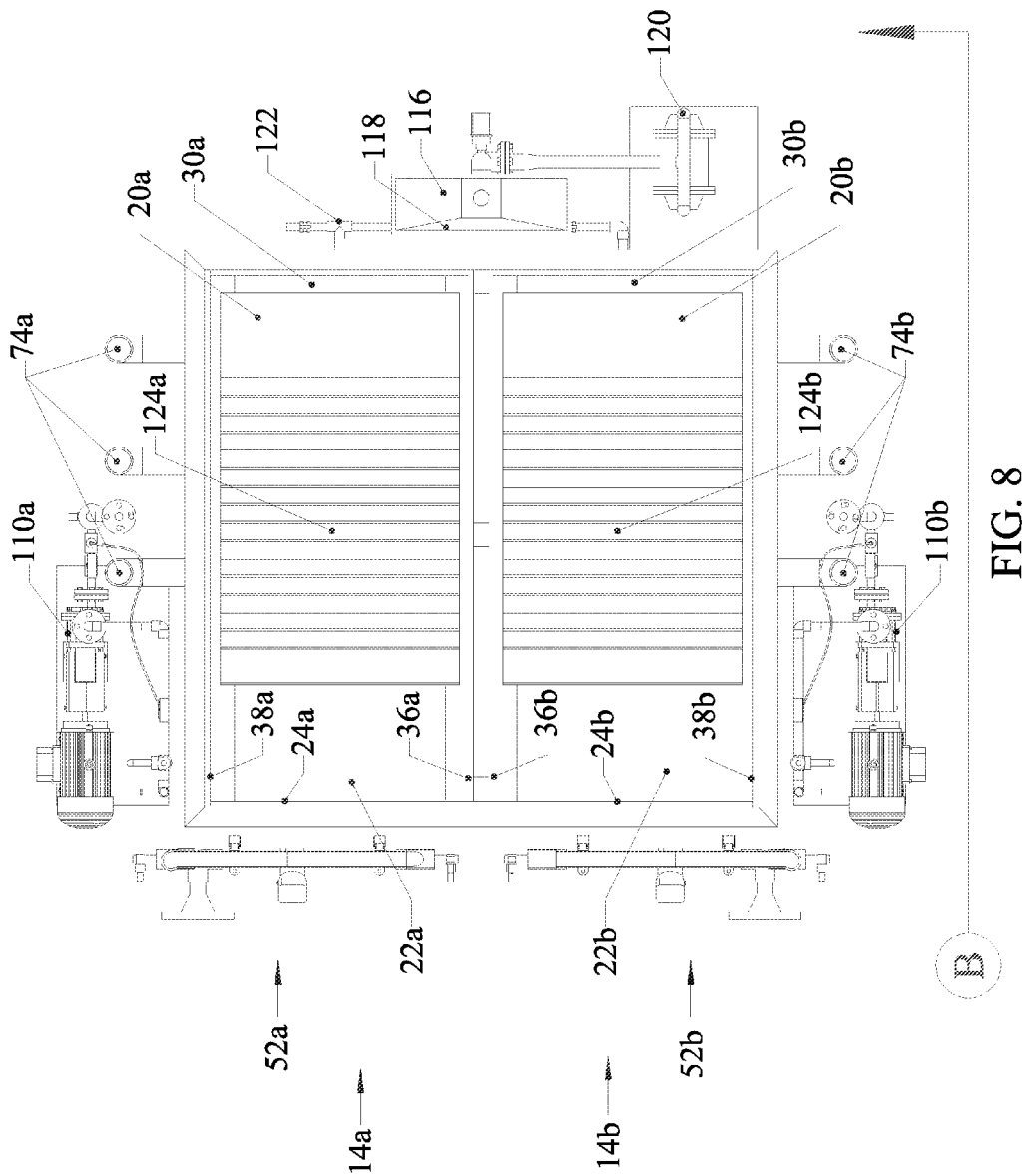
FIG. 8 shows a plan view of the cross cut indicated in FIG. 7.
Figure 9:
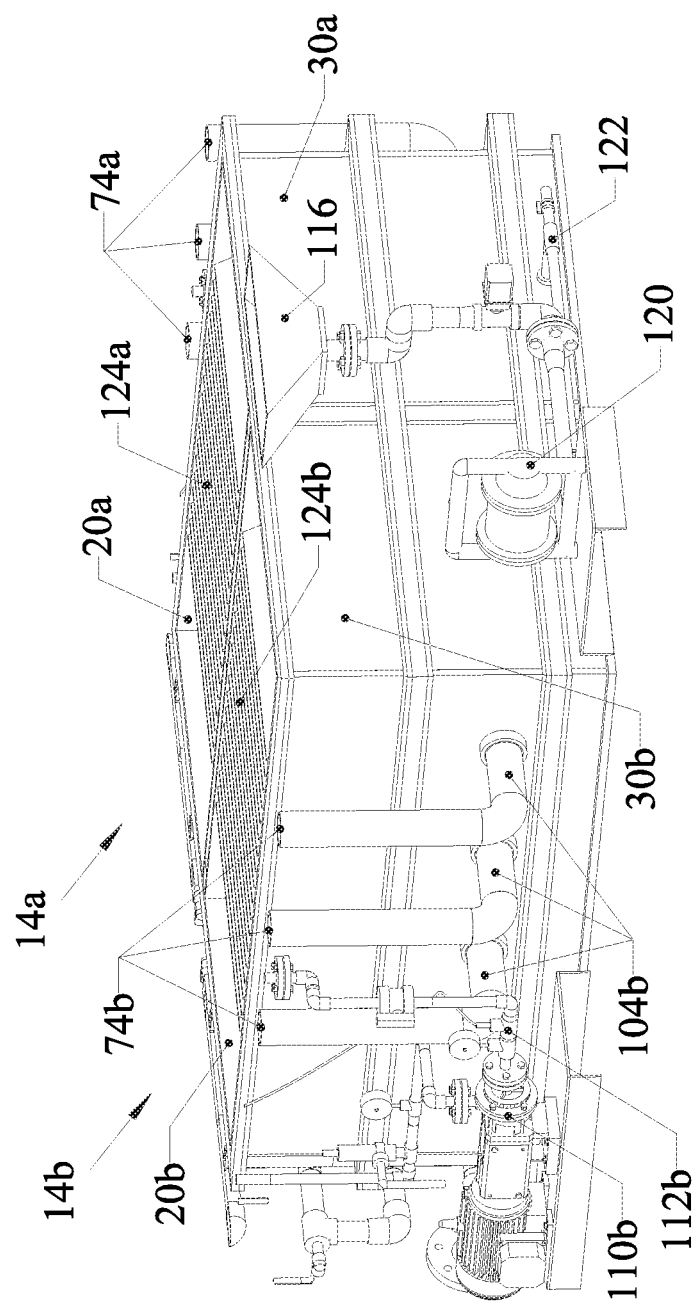
FIG. 9 shows a perspective view of the cutaway view shown in FIG. 8.
Figure 10:
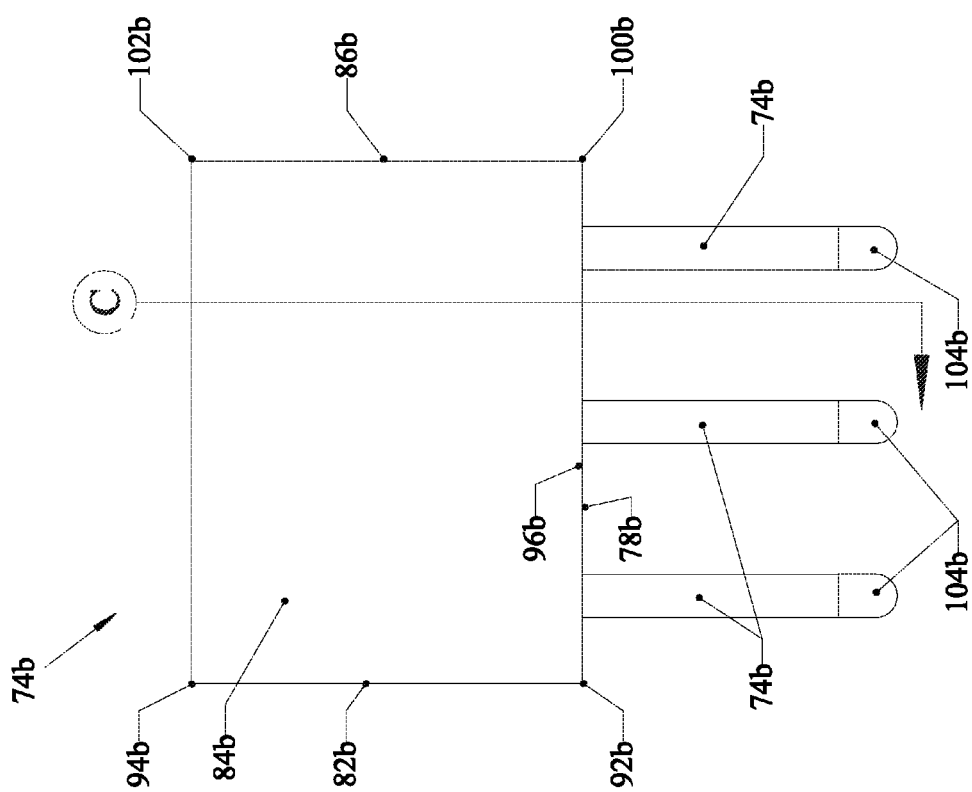
FIG. 10 shows a side view of a clear well and adjustable risers of a first embodiment.
Figure 11:
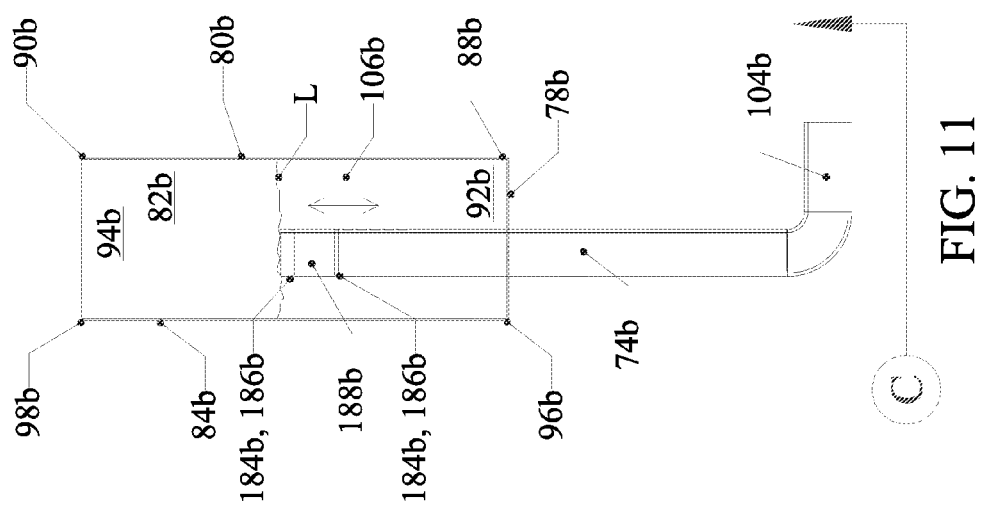
FIG. 11 shows a cutaway end view of a clear well and adjustable risers of a first embodiment.
Figure 12:
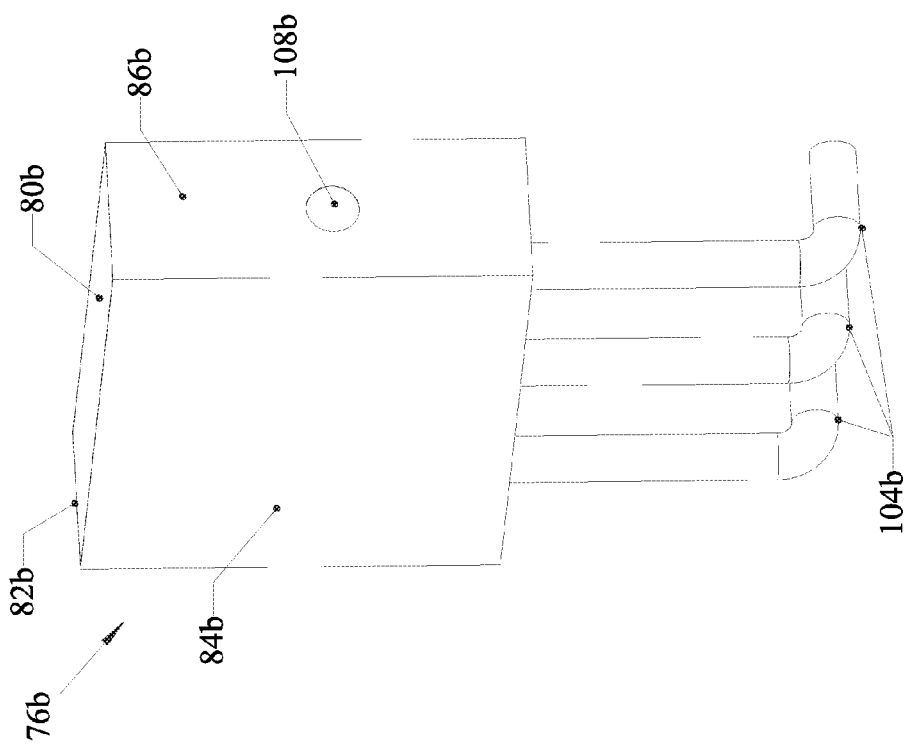
FIG. 12 shows a perspective view of a clear well and adjustable risers of a first embodiment.
Figure 13:
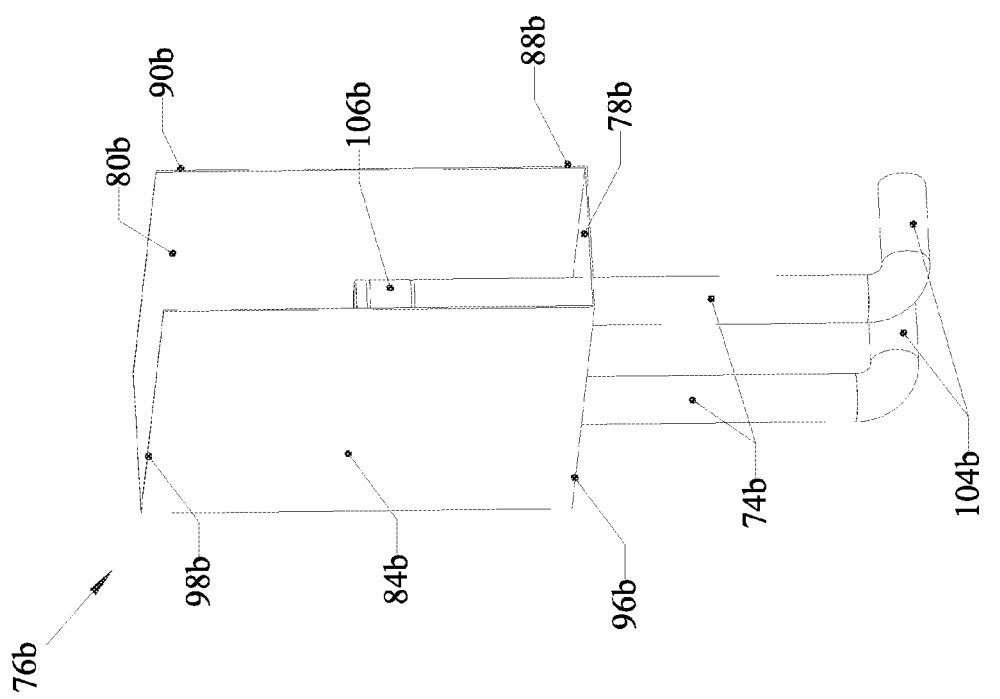
FIG. 13 shows a perspective view of the cutaway view of FIG. 11.

Referring to FIGS. 6 and 6A, in the first embodiment effluent weir 66*ab* is an elongated pipe section with a closed top portion 68*ab* having an upward peaked top with apex 142*ab* extending the length of the pipe section. In the embodiment, effluent weir 66*ab* extends from a closed end 144*ab* proximal to common inside side wall 36 to the effluent weir discharge 72*ab* proximal to outside side wall 38*ab*. As shown in FIGS. 6A and 17-20B, in the embodiment the cross section of effluent weir 66*ab* is essentially a diamond shape, with apex 142*ab* up, and with the bottom apex open where bottom inlet 70*ab* is located. The peaked top prevents sediment from accumulating on the top of the weir. In the embodiment, the interior cross section of effluent weir 66*ab* is greater than that of clear well riser lower portion 104*ab*, creating a small dead volume 146*ab* where errant flocculate is trapped rather than flowing into clear well riser 74*ab*.

Referring to FIGS. 9-13 and 17-20B, the height of clear well riser discharge 106*ab* is adjustable in order to adjust the operating level L of the system 10. Clear well riser 74*ab* includes an open riser end 194*ab*, a plurality of dimples 190*ab* distributed vertically and a plurality of scored grooves 184*ab* around its circumference to receive sealing members 186*ab*, in the embodiment gaskets or o-rings, to seal against a separable adjustable weir discharge member 188*ab* which mounts over the end of riser 74*ab* and seals against o-rings 186*ab*. Set screw 190*ab* threads through separable weir discharge member 188*ab* selectively engaging dimples 192*ab* to set the discharge height. In the embodiment, a plurality of horizontal effluent weirs 66*ab* and corresponding clear well risers 74*ab* is provided, oriented transversely across the lower portion of separation tank 20*ab*, which enhances even and laminar flow through separation tank 20*ab* and reduces water velocities to permit maximum separation of particulates from the water stream. Each of clear well riser discharges 106*ab* is height adjustable.

Referring to FIGS. 1-9, in the first embodiment the aeration injector is an aeration turbine pump 110*ab* taking its primary suction from clear well 74*ab* via supply line 148*ab*, recycling from 10% to 50% of the effluent flow. When operating at continuous flow conditions, aeration turbine pump 110*ab* will supply aerated water in the range 20-100 psig, fed by either ambient or compressed air based on operator selection. Under these conditions pump 110*ab* will generate gas bubbles in the range 20 to 30 microns at a gas saturation rate of 8-10% by volume of the recirculated water flow. Normal system operating temperatures are in the range of approximately 32° F. to 210° F. (0° C. and 99° C.) for water treatment (i.e. approximately freeze point to boiling point).

In the first embodiment, surface skimmer 16 comprises paddles 156 coupled to a cyclical drive train, the paddles 156 travelling longitudinally along the surface L of the liquid in the separation tank 20*ab* to push retentate over sludge plate 48*ab*. First cyclical drive mechanism 150 is mounted above first treatment section separation tank 20*a* and extends from a first drive mechanism first end 152 which is approximately at the first separation tank first end wall 24*a* to a first drive mechanism second end 154 which is approximately at the first separation tank second end wall 30*a*. A first group of paddles 156 is coupled to first skimmer drive mechanism 150 to extend transversely across the width of first treatment unit separation tank 20*a*. Like the first cyclical drive mechanism, a second cyclical drive mechanism 158 is mounted above the second treatment section separation tank 20*b* and extends from a second drive mechanism first end 160 which is approximately at the second separation tank first end wall 24*b* to a second drive mechanism second end 162 which is approximately at the second separation tank second end wall 30*b*. A second group of paddles 156 is coupled to first skimmer drive mechanism 150 to extend transversely across the width of second treatment unit separation tank 20*b*. First and second cyclical drive systems 150 and 158, respectively, cyclically move each paddle 156 of the respective first and second groups of paddles from approximately the first and second treatment section first end walls 24*a* and 24*b*, respectively, to approximately the first and second treatment section second end walls 30*a* and 30*b*, respectively, and over the respective sludge plates 48*a* and 48*b* to skim retentate from the surface of water in the separation tanks 20*a* and 20*b*. In the embodiment, first and second cyclical drive mechanisms are closed loop chain drives, each having a pair of parallel chains 172 engaged by drive sprockets 174 coupled to a common drive shaft 176 and idler sprockets 178 coupled to a common idler shaft 180. Skimmer drive motor 182 is coupled to common drive shaft 176 to cycle the chain drives.

Each paddle 156 includes a rigid coupling flange 164 adapted to couple to a cyclical drive mechanism 150 or 158, and a flexible wiper 166 coupled to and extending beyond rigid coupling flange 164. In the embodiment, rigid coupling flange 164 has opposing wing flanges 168 and 170 which are bolted directly to chains 172. Flexible wipers 166 engage against sludge plate 48*ab* to force retentate against and then over sludge plate 48*ab* into sludge hopper 118 and to compress clean water from the retentate as it is forced up the inclined sludge plate 48*ab*. Surface skimmer 16 is mounted at a height such that paddles 156 will extend into the liquid several inches below the operating level L throughout the anticipated range.

In an alternative arrangement, first and second treatment sections 14*a* and 14*b* may be used for sequential treatment by aligning the clear well effluent discharge 108*ab* from one treatment section to the inlet 54*ab* of the adjacent unit. A temporary pump may be installed in the interconnection to improve flow.

Referring to FIGS. 21-25 a second embodiment of a modular dual vessel dissolved aeration flotation treatment system 1010 is shown, having an improved effluent weir system installed. The second embodiment of the DAF is generally similar to the first embodiment, having a frame 1012, first and second treatment sections 1014*a* and 1014*b* mounted to frame 1012 adjacent each other, a surface skimmer 1016 mounted to the first and second treatment sections 1014*ab*, and a sludge collection section 1018. First and second treatment sections are essentially identical and items shall be referred to as "a" and "b", as described in the first embodiment.

Each of the first and second treatment sections 1014*ab* includes a separation tank 1020*ab*, having a volume defined by a bottom wall 1022*ab*, first and second end walls 1024*ab* and 1030*ab*, respectively, and inside and outside side walls 1036*ab* and 1038*ab*, respectively, with inside walls 1036*a* and 1036*b* forming a common inside wall 1036. In the embodiment, bottom wall 1022*ab* is formed from inclined plates to enhance sediment removal. Inside and outside side walls and first and second end walls, 1036*ab*, 1038*ab*, 1024*ab* and 1030*ab*, respectively, connect to bottom wall 1022*ab* at their bottom portions 1040*ab*, 1044*ab*, 1026*ab* and 1032*ab*, respectively, and extend vertically to their top portions 1042*ab*, 1046*ab*, 1028*ab* and 1034*ab*, respectively. Sludge plate 1048*ab* extends at an incline from the interior volume of separation tank 1020*ab* below the operating level L of the system 1010 over the abutting sludge hopper 1116 of sludge collection section 1018. Sludge plate 1048*ab* is preferably inclined at an angle in the range 30° to 50° from horizontal.

Flocculator portion 1052*ab* includes an inlet 1054*ab*, an outlet 1056*ab* to discharge into separation tank 1020*ab*, aeration mixing chamber 1058*ab* disposed between the flocculator portion inlet 1054*ab* and outlet 1056*ab*, an aeration injection port 1060*ab* proximal to the upstream end of aeration mixing chamber 1058*ab*, and chemical injection ports 1064*ab* and 1140*ab* between inlet 1054*ab* and aeration injection port 1060*ab*. Flocculator portion 1052*ab* includes two horizontal stages 1132*ab* and 1134*ab*, with first and second stage chemical injection ports 1064*ab* and 1138*ab*, respectively. Effluent weirs 1066*ab* within separation tank 1020*ab* in fluid communication with clear well risers 1074*ab* at clear well riser bottom portions 1104*ab* direct flow of clean effluent into clear well 1076*ab*, each of which is positioned adjacent its respective separation tank 1020*ab* on the common frame 1012. In the second embodiment two effluent weirs 1066*ab* and corresponding clear well risers 1074*ab* are provided for each clear well 1076*ab* on this smaller capacity unit, located proximal to the bottoms of the separation tank sidewalls and end walls but above the region where separation tank bottom wall 1022*ab* slopes downward to prevent ingestion of sediments. Clear well discharge 1108*ab* directs clarified effluent out of the system for further processing or reuse. Aeration turbine pump 1110*ab* takes suction 1112*ab* from clear well 1076*ab* via supply line 1148*ab* to recycle effluent, and injects the aerated effluent into aeration injection port 1060*ab* proximal to the upstream end 1062*ab* of aeration mixing chamber 1058*ab*.

Again referring to FIGS. 21-25, a second embodiment includes a stilling well 1128*ab* mounted to each separation tank 1020*ab* to receive the pre-treated flow from flocculator portion discharge 1056*ab* and discharge this flow into the volume of separation tank 1020*ab* at a lower velocity, and to evenly distribute the flow transversely across separation tank 1020*ab*. Stilling well 1128*ab* essentially blocks direct flow from the flocculator portion, which is pressurized, in order to increase the dwell time, enhance the laminar flow characteristics within the separation tank, prevent bubbles from being stripped from particles by the higher velocity water, and cause heavier particles to immediately separate. In the second embodiment, stilling wells 1128*ab* include angled bottoms with drains 1130*ab* which can be aligned to sludge pump 1120 to remove sediment buildup.

In the second embodiment, surface skimmer 1016 is similar to the first embodiment, having dual chain drives 1150 and 1158 with chains 1172 coupled to paddles 1156 with rigid coupling flanges 1164 and flexible wiper portions 1166. Drive motor 1182 couples to drive shaft 1176 and drive sprockets 1174 to cycle chains 1172. The paddles 1156 push retentate to sludge plate 1048*ab* and the flexible wipers 1166 engage against sludge plate 1048*ab* to concentrate and partially dewater retentate as it is pushed over into sludge hopper 1116 with sludge hopper end wall 1118 abutting first and second separation tank second end walls 1130*ab*.

Figure 26:
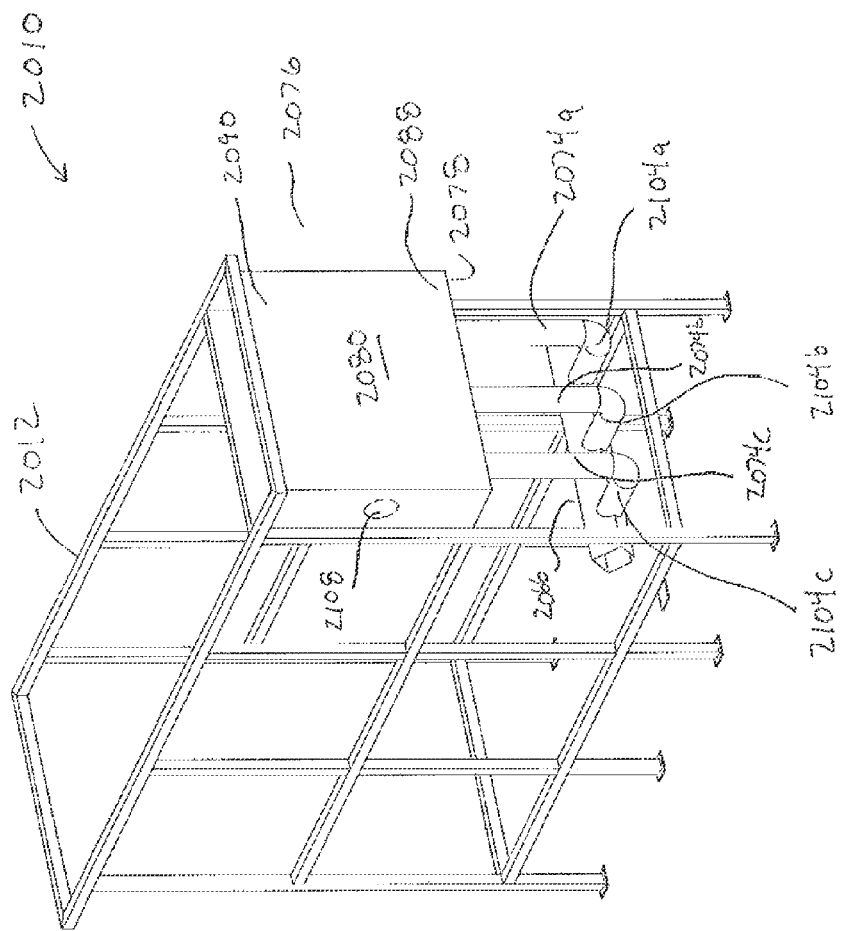
FIG. 26 shows a perspective view of a third embodiment.
Figure 27:
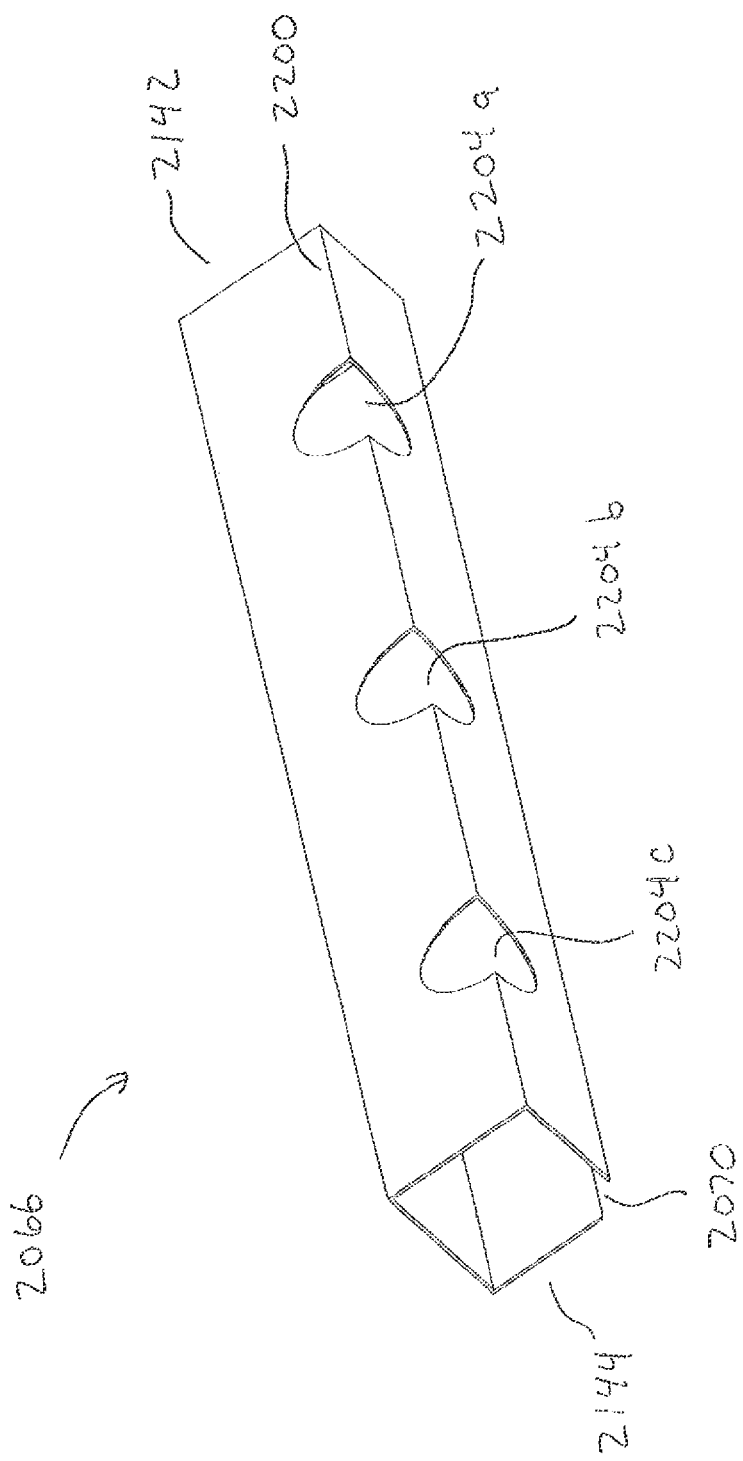
FIG. 27 shows a perspective view of a receiving weir of a third embodiment.
Figure 79:
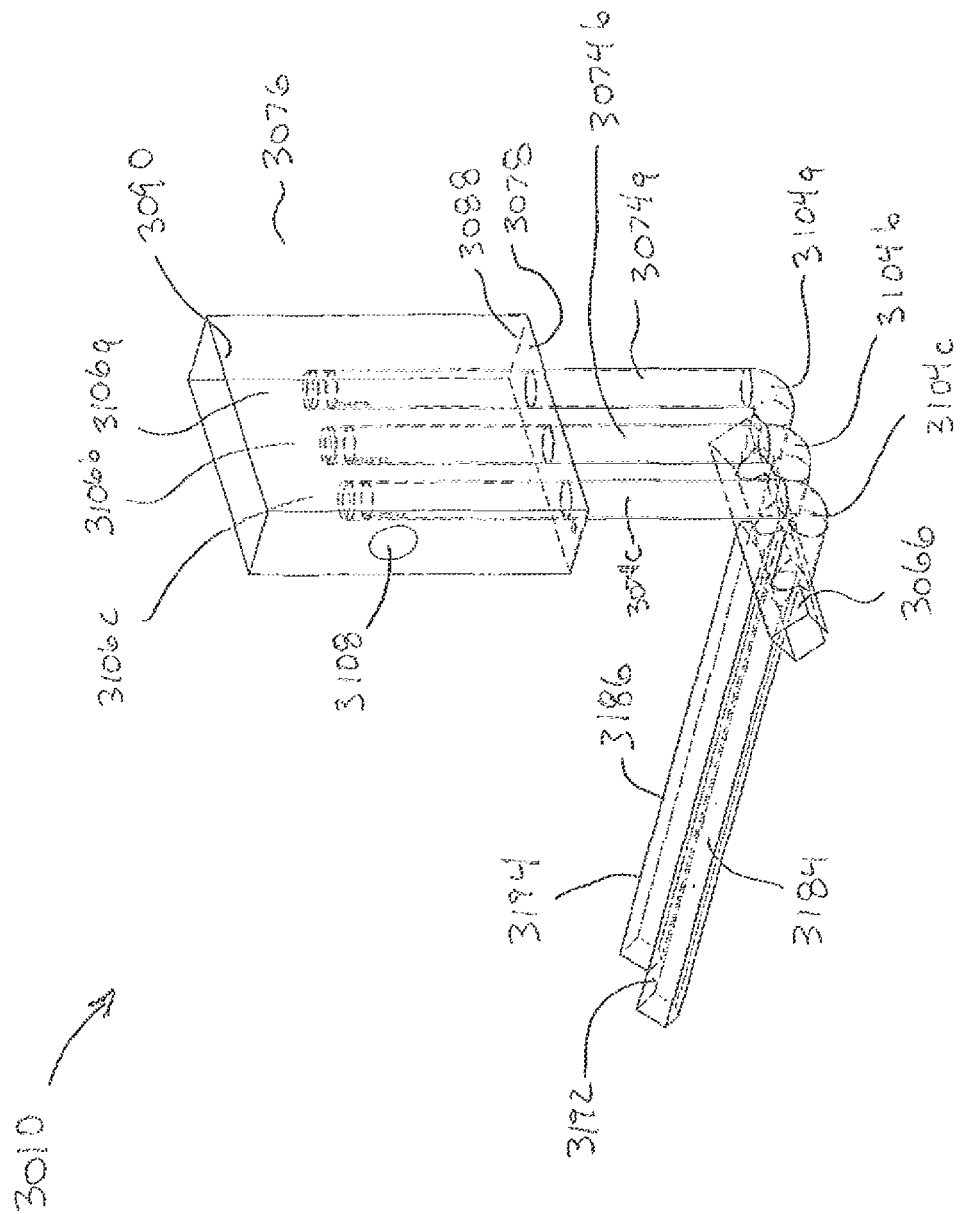
Figure 31:
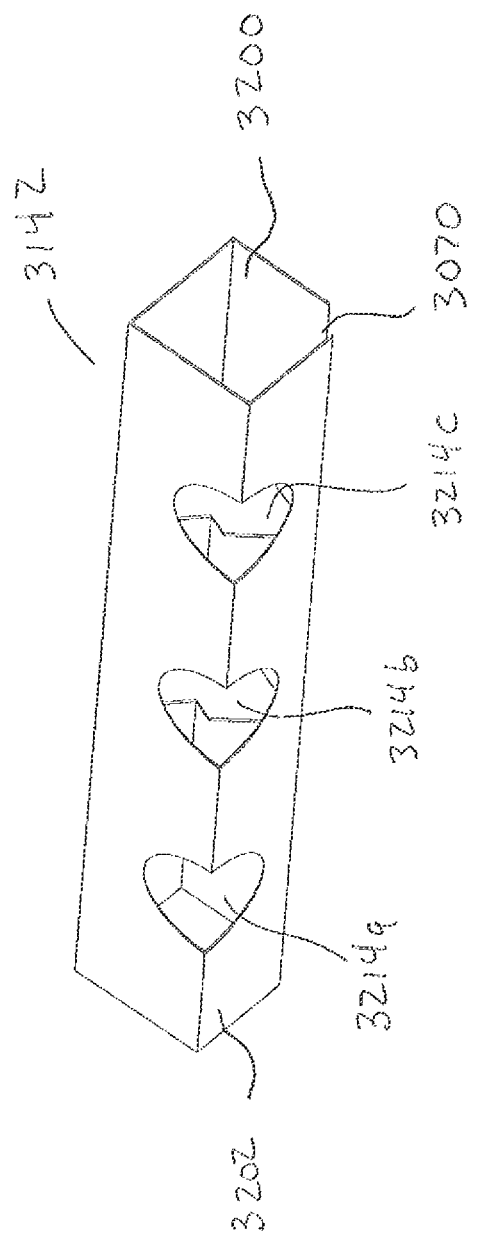
FIG. 31 shows a lateral perspective view of a receiving weir of a fourth embodiment.
Figure 32:
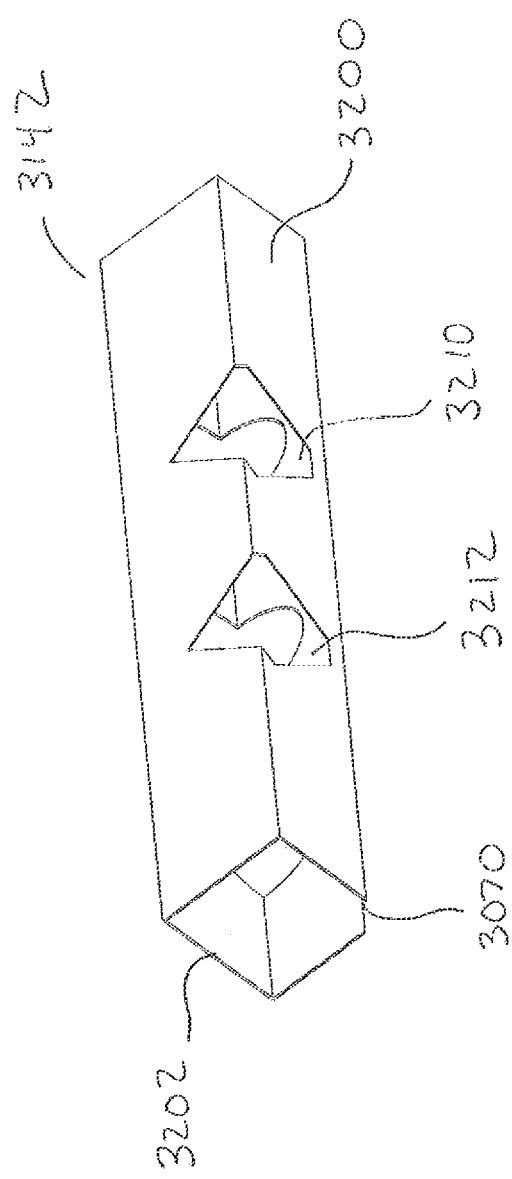
FIG. 32 shows an opposing lateral perspective view of a receiving weir of a fourth embodiment.

Referring to FIGS. 26-28, a third embodiment 2010 of an improved effluent weir system is provided, showing primarily only the weir structures. In the Figures, the frame 2012 of a fluid treatment system having a separation tank is shown, without the separation tank walls or peripheral equipment visible. The improved effluent weir system 2010 includes a receiving weir 2066 mountable within a separation tank (not shown, contained within frame 2012), having an enclosed top portion 2068 with an upward peaked top with apex 2142 extending the length of receiving weir 2066. Receiving weir 2066 extends from a first open end 2144 to a second open end 2146. In the embodiment the cross section of receiving weir 2066 is essentially a diamond shape, with apex 2142 up, and with the bottom apex open where bottom inlet 2070 is located.

Clear well 2076, mounted to frame 2012 alongside the separation tank (not shown) is in fluid communication with the separation tank through receiving weir 2066. Clear well 2076 is defined by a bottom wall 2078 and enclosing side walls 2080 extending from a bottom portion 2088 connected to the clear well bottom wall 2078 to a top portion 2090. Clear well 2076 includes a clear well discharge 2108.

In the embodiment, three clear well risers 2074*a*, 2074*b* and 2074*c* extend from bottom portions 2104*a*, 2104*b*, 2104*c*, respectively, to a riser discharges 2106*a*, 2106*b*, 2106*c*, respectively. Each riser bottom portion 2104*a*, 2104*b*, 2104*c*, is coupled to receiving weir 2066 at a respective cutout 2204*a*, 2204*b*, 2204*c*, providing fluid communication between the separation tank volume with the clear well through receiving weir 2066 and clear well risers 2074*a*, 2074*b* and 2074*c*. Receiving weir 2066 is mounted within the separation tank (not shown) in a normal orientation to clear well riser bottom portions 2104*a*, 2104*b*, 2104*c*, along a lateral side 2200 of receiving weir 2066.

Referring to FIGS. 29-35, a fourth embodiment 3010 of an improved effluent weir system provided, showing primarily only the weir structures. In the embodiment, the improved system 3010 includes a receiving weir 3066 mountable with the separation tank (not shown, but mounted within frame 3012), the receiving weir including an enclosed top portion 3068, a bottom inlet 3070, and opposed first and second lateral sides 3200 and 3202, respectively. In the embodiment, first and second effluent weirs 3184 and 3186 are mounted within the separation tank, extending from a first end 3206, 3208, respectively, to a second end 3188, 3190, respectively, into the volume of the separation tank. Each effluent weir 3184, 3186, has an enclosed top portion 3192, 3194 respectively, and a bottom inlet 3196, 3198, respectively. Each second end 3188, 3190 is coupled to receiving weir 3066 along the receiving weir first lateral side 3200 at cutouts 3210 and 3212, respectively. In the embodiment, effluent weir first ends 3206, 3208 are closed to direct flow through bottom inlets 3196, 3198 and 3070.

Clear well 3076 is in fluid communication with the separation tank through receiving weir 3066 and effluent weirs 3184 and 3186. Clear well 3076 is defined by a bottom wall 3078 and enclosing side walls 3080 extending from a bottom portion 3088 connected to the clear well bottom wall 3078 to a respective top portion 3090, the clear well further including a clear well discharge 3108.

Clear well risers 3074*a*, 3074*b* and 3074*c* extend from respective bottom portions 3104*a*, 3104*b* and 3104*c*, coupled to receiving weir 3066 at cutouts 3214*a*, 3214*b* and 3214*c*, respectively, to their respective riser discharges 3106*a*, 3016*b* and 3106*c*. In the embodiment, receiving weir 3066 has closed ends. In the embodiment, each of clear well riser discharges 3106*a, b* & *c* includes a separable riser discharge member 3188*a, b* & *c*, respectively, providing height adjustment ability to thereby control the liquid operating level of the separation tank.

In operation, the improved effluent weir systems operate similarly, so the first embodiment will be described in detail. A liquid stream, for example waste water, to be treated is received through inlets 54*ab* and passes through flocculator portion stages 132*ab*, 134*ab* and 136*ab*. Treatment chemicals such as flocculate agents are injected through one or more of chemical injection ports 64*ab*, 138*ab* and/or 140*ab*, to pre-treat the waste water before mixing with aerated water. The chemicals react with particulates in the waste water to create larger, less dense agglomerations of coagulated particles which are more susceptible to binding with air bubbles. The elongated, multi-stage flocculator portion 52*ab* provides a dwell time of 5 to 120 seconds under normal flow conditions. Aeration turbine pump 110*ab* injects clarified effluent saturated with air into the aeration mixing chamber 58*ab* inline with the flow of pre-treated waste water to thoroughly mix with the pre-treated waste water and partially expand to form air bubbles. Pre-treated aerated waste water enters the separation tank 20*ab* through flocculator portion discharge 56*ab*. The waste water flows along the tank 20*ab* and downward along the parallel plates 124*ab* within the plate packs 122*ab* which causes heavier particles to separate and drop to the tank bottom, and lighter particles to which gas bubbles have adhered to rise to the surface. Clean effluent passes into effluent weirs 66*ab* through bottom inlets 70*ab*, through clear well riser lower portions 104*ab* and clear well risers 74*ab*, into clear well 76*ab* through riser discharges 106*ab*. Heavy particulates descend to the bottom of the tank as sediments, without entering effluent weirs 66*ab*, deflected by upward peaked top portions 68*ab*. To the extent some sediment may accumulate on top portions 68*ab*, this is easily cleaned by pressure washing from above when the tank is drained. Clarified effluent in clear well 76*ab* is either discharged through clear well discharge 108*ab*, or recycled through aeration turbine pump 110*ab* via supply line 148*ab*. The height of clear well riser discharge 106*ab* determines the operating level L in the system. The total dwell time of the system 10 at normal operating conditions will be in the range 10 minutes to 30 minutes for each treatment section 14*ab*—measured from waste water entry into the flocculator portion inlet 54*ab* to the clear well discharge 108*ab*.

Within separation tanks 20*ab*, flocculates rise to the surface—referred to as retentate. Paddles 156 are cyclically driven along the liquid surface of separation tanks 20*ab* to push retentate toward the back of the tank to the "beach"—i.e. sludge plates 48*ab*. As the retentate is pushed up sludge plates 48*ab* much of the entrained water drains back into the tank 20*ab* and the retentate is concentrated, then pushed over the edge into sludge hopper 116. As sludge accumulates in hopper 116 sludge pump 120 will periodically activate to transfer sludge to a removal container or some other receiver for further processing.

Controls may be provided in a common control panel to control the entire skid, or local controls may be provided, or a combination of both, as is known in the art.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. An effluent weir system for a fluid treatment system having a separation tank, the effluent weir system comprising:
   one or more effluent weirs mountable within the separation tank, each effluent weir extending from a first end to a second end, the effluent weir having an enclosed top portion and a continuous bottom inlet and a discharge in fluid communication with a clear well riser, each effluent weir bottom inlet extending from proximate the respective effluent weir first end to proximate the effluent weir second end;
   a clear well in fluid communication with the separation tank through at least the one or more effluent weirs, the clear well defined by a bottom wall and enclosing side walls, each clear well side wall extending from a bottom portion connected to the clear well bottom wall to a top portion, the clear well further including a clear well discharge;
   a clear well riser extending from a bottom portion in fluid communication with the effluent weir to a top end, the top end further comprising a clear well riser discharge;
   each effluent weir further comprising:
   an elongated pipe extending to a closed end within the separation tank, the pipe cross section comprising a diamond shape oriented with an apex on top.

2. The system of claim 1, further comprising:
   wherein the elongated pipe cross section is substantially square.

3. The system of claim 1, further comprising:
   wherein the interior cross section of the effluent weir extends beyond the interior cross section of clear well riser bottom portion.

4. The system of claim 1, further comprising:
   wherein the height of the clear well riser discharge within the clear well is adjustable.

5. The system of claim 4, the adjustable height clear well riser further comprising:
   each clear well riser further including an open top end;
   a movable weir discharge member slidingly engagable over the clear well riser top end;
   a first sealing member disposed between the clear well riser top end and the movable weir discharge member to seal therebetween; and,
   a locking member selectively engagable between the movable weir discharge member and the clear well riser top end at user-selectable heights.

6. The system of claim 5, the adjustable height clear well riser further comprising:
   a second sealing member disposed between the clear well riser top end and the movable weir discharge member.

7. The system of claim 6, further comprising:
   the clear well riser top end further including a second exterior channel circumscribing the clear well riser proximate the clear well riser top end;
   the second sealing member comprising a pliable ring insertable into the second exterior channel.

8. The system of claim 5, further comprising:
   the clear well riser top end further including a first exterior channel circumscribing the clear well riser proximate the clear well riser top end;
   the first sealing member comprising a pliable ring insertable into the first exterior channel.

9. The system of claim 8, further comprising:
   the clear well riser top end further including a second exterior channel circumscribing the clear well riser proximate the clear well riser top end;

the second sealing member comprising a pliable ring insertable into the second exterior channel.

10. The system of claim 1, further comprising:
a plurality of effluent weirs and a plurality of clear well risers, each effluent weir discharge in fluid communication with a corresponding clear well riser.

11. The system of claim 10, wherein the height of each of the plurality of clear well riser discharges within the clear well is adjustable.

12. The system of claim 10, each adjustable height clear well riser further comprising:
each clear well riser further including an open top end;
a movable weir discharge member slidingly engagable over the clear well riser top end;
a first sealing member disposed between the clear well riser top end and the movable weir discharge member to seal therebetween; and,
a locking member selectively engagable between the movable weir discharge member and the clear well riser top end at user-selectable heights.

13. The system of claim 12, each adjustable height clear well riser further comprising:
a second sealing member disposed between the clear well riser top end and the movable weir discharge member.

14. The system of claim 12, further comprising:
the clear well riser top end further including a first exterior channel circumscribing the clear well riser proximate the clear well riser top end;
the first scaling member comprising a pliable ring insertable into the first exterior channel.

15. An effluent weir system for a fluid treatment system having a separation tank, the effluent weir system comprising:
a receiving weir mountable within the separation tank, the receiving weir extending from a first end to a second end and including an enclosed top portion and a bottom inlet, the receiving weir further including first and second lateral sides, the respective receiving weir top portion and first and second lateral sides defining a diamond-shaped cross-section, the receiving weir bottom inlet extending from proximate the receiving weir first end to proximate the receiving weir second end;
a clear well in fluid communication with the separation tank through the receiving weir, the clear well defined by a bottom wall and enclosing side walls each clear well side wall extending from a bottom portion connected to the clear well bottom wall to a top portion, the clear well further including a clear well discharge;
one or more clear well risers extending from a respective riser bottom portion coupled to and in fluid communication with the receiving weir discharge to a respective riser discharge; and,
one or more effluent weirs mountable within the separation tank, each effluent weir having an enclosed top portion and first and second later sides extending downward from the enclosed top portion and defining a diamond-shaped cross-section, and a bottom inlet and extending from a first end to a second end, each second end coupled to and in fluid communication with the receiving weir, each effluent weir bottom inlet extending from proximate the respective effluent weir first end to proximate the respective effluent weir second end.

16. The system of claim 15, further comprising:
the one or more clear well riser bottom portions coupled to the receiving weir along the receiving weir first lateral side and the one or more effluent weirs coupled to the receiving weir along the receiving weir second lateral side.

17. The system of claim 15, further comprising:
wherein, the height of each of the plurality of clear well riser discharges within the clear well is adjustable.

* * * * *